United States Patent [19]
Jain

[11] Patent Number: 6,038,386
[45] Date of Patent: Mar. 14, 2000

[54] METHOD FOR CONTROLLING POWER AND SLEW IN A PROGRAMMABLE LOGIC DEVICE

[75] Inventor: Gitu Jain, Sunnyvale, Calif.

[73] Assignee: Xilinx, Inc., San Jose, Calif.

[21] Appl. No.: 08/918,731

[22] Filed: Aug. 21, 1997

[51] Int. Cl.[7] .................................................. G06F 17/50
[52] U.S. Cl. .............................. 395/500.17; 395/500.03; 395/500.07; 395/500.18
[58] Field of Search .................... 364/488–491, 364/578; 395/500.02–500.19

[56] References Cited

U.S. PATENT DOCUMENTS

| | | | |
|---|---|---|---|
| 5,197,016 | 3/1993 | Sugimoto et al. .................. | 395/500.19 |
| 5,224,056 | 6/1993 | Chene et al. ....................... | 395/500.08 |
| 5,258,919 | 11/1993 | Yamanouchi et al. ............. | 395/500.12 |
| 5,553,001 | 9/1996 | Seidel et al. ........................ | 395/500.05 |
| 5,612,892 | 3/1997 | Almulla .............................. | 395/500.07 |
| 5,673,198 | 9/1997 | Lawman et al. .................... | 395/500.12 |
| 5,712,790 | 1/1998 | Ditlow et al. ....................... | 395/500.03 |
| 5,715,408 | 2/1998 | Chidhambarakirshnan ............ | 710/126 |
| 5,761,078 | 6/1998 | Fuller et al. ........................ | 395/500.17 |
| 5,818,728 | 10/1998 | Yoeli et al. ......................... | 395/500.17 |
| 5,825,662 | 10/1998 | Trimberger ......................... | 395/500.04 |
| 5,892,681 | 4/1999 | McDermith et al. ............... | 395/500.19 |

OTHER PUBLICATIONS

Alexander ("Power Optimization for FPGA Look–Up Tables", ISPD '97, ACM, Jan. 1997, pp. 156–162).

Xilinx, Inc. ("The Programmable Logic Data Book", copyrighted Aug. 1, 1996, pp. 3–3 to 3–68, published by Xilinx, Inc., 2100 Logic Drive, San Jose, CA 95123).

"The Programmable Logic Data Book", copyright 1996, pp. 3–3 to 3–68, published by Xilinx, Inc., 2100 Logic Drive, San Jose, CA 95124, Aug. 1, 1996.

*Primary Examiner*—Kevin J. Teska
*Assistant Examiner*—Phallaka Kik
*Attorney, Agent, or Firm*—Patrick T. Bever; Jeanette S. Harms

[57] ABSTRACT

A method for controlling power consumption and output slew rate in a programmable logic device, which is programmable to emulate a user-defined logic function. After placing and routing the user-defined logic function such that a plurality of paths are assigned to associated resources of the programmable logic device, a group of the resources associated with at least one path of the logic function which is constrained by a user-defined timing specification is identified. These resources are sorted according to their respective power consumption. A first sub-group of the resources is then identified which, when operated in a low power mode, minimizes power consumption of the programmable logic device while satisfying the user-defined timing specifications of all paths. Also, a second sub-group of the resources is identified which, when operated in a slow slew mode, minimizes noise at the output terminals of the programmable logic device while satisfying the user-defined timing specifications of all paths ending at that output terminal. A target PLD is then programmed in accordance with the placement arrangement, and the resources of the first and second groups are set to low power mode and slow slew mode, respectively.

20 Claims, 17 Drawing Sheets

METHOD FOR CONTROLLING POWER AND SLEW IN A PROGRAMMABLE LOGIC DEVICE

FIELD OF THE INVENTION

The present invention relates to programmable logic devices, and more specifically to a method for automatically controlling power and slew in programmable logic devices in order to optimize performance characteristics.

BACKGROUND OF THE INVENTION

Programmable logic devices (PLDs) are a class of integrated circuits (ICs) which can be programmed by a user to implement a logic function. Logic designers typically use PLDs to implement logic functions in electronic systems because, unlike custom hardwired or "application specific" integrated circuits (ASICs), PLDs can be programmed in a relatively short amount of time, and often can be reprogrammed quickly to incorporate modifications to the implemented logic function.

One major class of PLDs are referred to as programmable logic array (PLA) devices or programmable array logic (PAL) devices. Basically, these early PLDs include an AND plane which ANDs two or more input signals to produce product terms (P-terms), and an OR plane which ORs two or more of the P-terms generated by the AND plane. The AND plane is typically formed as a matrix of programmable connections where each column connects to an input pin of the PLD, and each row forms a P-term element which is transmitted to the OR plane. The OR plane may be programmable (i.e., each P-term element is programmably connectable to one of several different OR plane outputs), in which case the PLD is called a PLA device. Alternatively, the OR plane may be fixed (i.e., each P-term element is assigned to a particular OR plane output), in which case the PLD is called a PAL device. The AND plane and OR plane of PLA and PAL devices implement logic functions represented in "sum-of-products" form.

PLA and PAL devices were well-received by logic designers when their implemented logic functions were relatively small. However, as logic functions grew increasingly larger and more complex, logic designers were required to wire together two or more small PLDs to provide sufficient logic capacity. Although this process was tolerated during development and testing, it increased the cost and size of production units. This generated a demand for PLDs with increasingly larger logic capacity.

To meet the ever-increasing demand for greater capacity, PLDs with increasingly complex architectures have been developed. One popular complex PLD type, known as complex programmable logic devices (CPLDs), includes two or more function blocks connected together and to input/output (I/O) modules by an interconnect matrix such that each of the function blocks selectively communicates with the I/O modules and with other function blocks of the CPLD through the interconnect matrix. Each function block of the CPLD is structured like the two-level PLDs, described above. In effect, these CPLDs incorporate several early PLDs and associated connection circuitry onto a single integrated circuit. This provides a circuit designer the convenience of implementing a complex logic function using a single IC.

Each function block of an early CPLD typically includes an AND array and a set of macrocells. The input signals of the AND array are received from the interconnect matrix. A specific number of P-term elements generated by the AND array are assigned to each macrocell. Each macrocell includes an OR gate which is programmable to receive one or more of the assigned P-term elements, and also to receive a sum-of-products term from an adjacent macrocell of the function block (see the discussion below regarding the "chaining" process). The OR gate of each macrocell produces a sum-of-products term which is either transmitted to the I/O modules of the CPLD, fed back through the interconnect matrix, or is transmitted on special lines to an adjacent macrocell.

As PLDs grow in size and complexity, the ability to adjust their performance characteristics (e.g., power consumption and signal quality/speed) is becoming more important to logic designers. For example, logic designers may require low power consumption and/or high quality output signals in some applications. In other applications, however, logic designers may be willing to sacrifice high power consumption and a reasonable amount of output signal noise for fast pin-to-pin speeds (i.e., the time required for a signal to pass from an input pin to an output pin). To address these contrasting requirements, some PLD manufacturers offer PLDs which are selectively operated in either a fast-speed, high-power mode or in a slow-speed, low-power mode. In addition, some PLDs provide adjustable slew rates which selectively reduce output noise at the expense of signal speed.

A problem with PLDs providing power and slew rate control arises when a logic designer requires high speed operation for only a portion of the implemented logic function. When this occurs, the logic designer often must run the entire PLD in the fast-speed, high power mode in order to meet the timing specifications of the small portion of the logic function. Of course, this increases power consumption of the entire PLD, even in portions of the logic function which do not require high-speed operation.

SUMMARY OF THE INVENTION

The present invention provides a method for programming PLDs to exploit power and slew rate control features which automatically reduces power consumption and output signal noise as much as possible without affecting the performance critical aspects of a user's logic function.

The power/slew rate optimization method is implemented after a user's logic function is partitioned, placed and routed (i.e., the logic function is broken into a set of logic portions and signal paths which are assigned to specific logic and interconnect resources of the target PLD). Before power/slew optimization, some of the paths are assigned timing specifications by the user (these paths are referred to herein as "timespec paths"). Each timing specification defines a maximum delay permitted for a signal passing along a corresponding timespec path. The power/slew controllable resources of the PLD through which signals pass along each timespec path are identified and grouped. The method then systematically analyzes these resources to determine which of the resources can be set in a low power or slow slew rate mode (in order to reduce power consumption and output noise) without violating the timing specification of any of the timespec paths. In particular, the method identifies those resources which, if switched to low power mode, minimize power consumption of the PLD without violating any timing specifications. Alternatively, the method identifies those resources which, if switched to slow slew mode, minimize output noise of the PLD without violating any timing specifications. To choose which timespec paths to optimize in the eventuality that either slew rate or power, but not both, can be reduced, the user is given additional control over whether slew rate control overrides power control, or vice versa.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

Some PLDs (such as the XC9500™ CPLD family manufactured by Xilinx, Inc. of San Jose, Calif.) provide users the capability of controlling power consumption by selectively operating macrocells in high power (fast), or low power (slow) modes. Users can also control the slew rate of an output signal by setting I/O modules in a slow slew rate (less noise) mode, or in a fast slew rate (more noise) mode. Given these capabilities, the present invention is directed to a method of automatically optimizing the power/slew settings of a PLD in order to minimize power consumption and noise at signal outputs while meeting the timing specifications (timespecs) assigned by the user to specific paths of the user's logic function.

The present programming method is described with particular reference to the XC9500 CPLD family. However, the present invention is not limited to the devices of the XC9500 CPLD family in that it is applicable to any PLD which allows selective control of the power and/or slew rate characteristics of the PLD.

A brief description of the XC9500 CPLD family is provided below. Additional description of the XC9500 CPLD family is provided in *The Programmable Logic Data Book,* 1996, pages 3-3 to 3-68, published by Xilinx, Inc., which are incorporated herein by reference.

CPLD Structure

Figure 1:
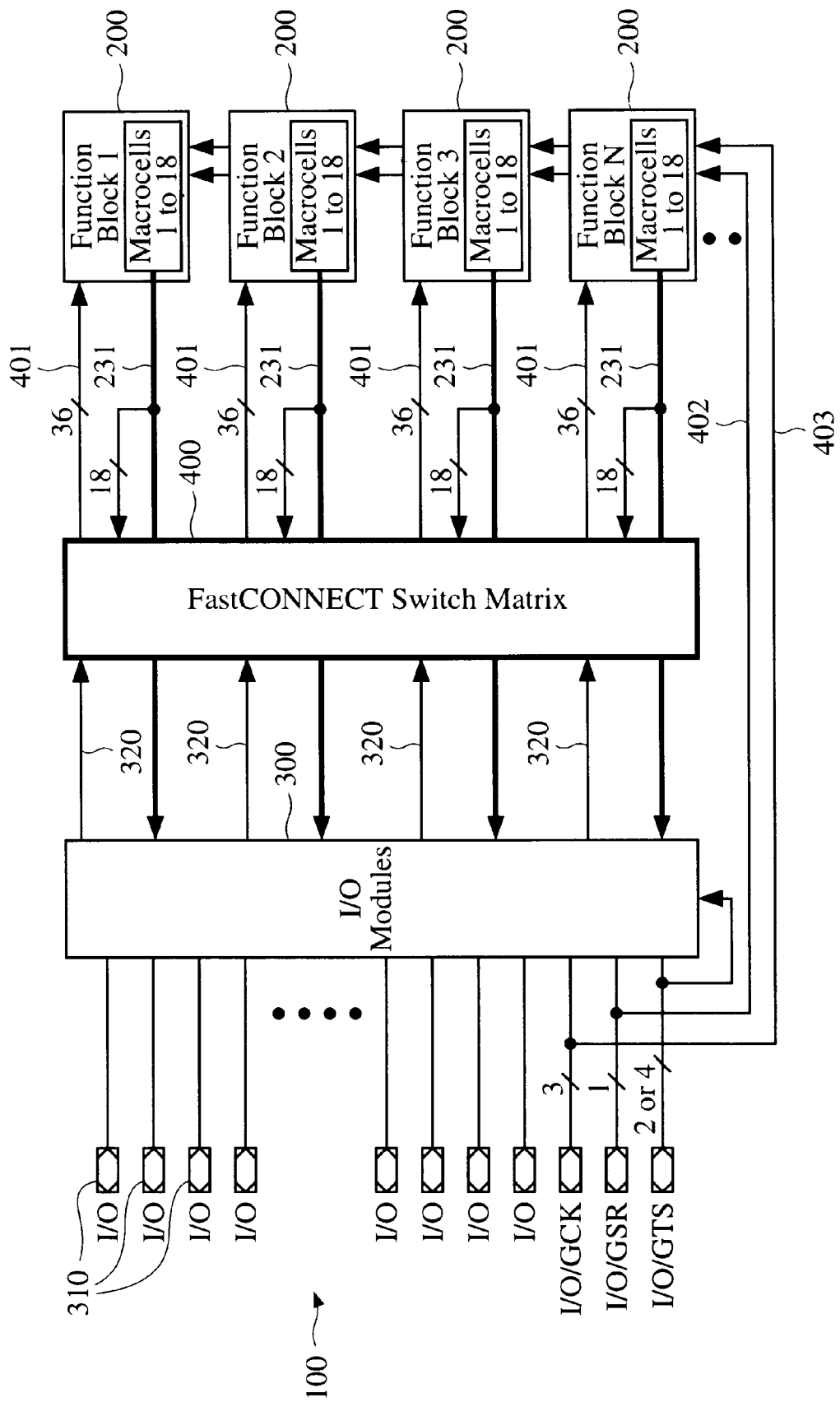
FIG. 1 is a circuit diagram showing a CPLD of the Xilinx XC9500 CPLD family.

FIG. 1 shows a simplified block diagram of a CPLD 100 which includes features common to the XC9500 CPLD family. Each CPLD 100 of the XC9500 CPLD family consists of multiple function blocks (FBs) 200 (four shown) and input/output (I/O) modules 300 which are interconnected by a FastCONNECT™ Switch Matrix (FSM) 400. The I/O modules 300 provide buffering for device inputs and outputs which are applied to input/output (I/O) pins 310. All input signals from the I/O modules 300 enter the FSM 400 on FSM input lines 320, and selected output signals from the FBs 200 are fed-back into the FSM 400 on macrocell output lines 231. Each FB 200 receives thirty-six (36) inputs on FB input lines 401 from the FSM 400 and produces ninety (90) P-term elements which are applied to any of eighteen (18) macrocells, each macrocell being programmable to provide a sum-of-products term from selected P-term elements. For each FB 200, twelve to eighteen outputs are selectively transmitted on macrocell output lines 231 to directly drive the I/O modules 300 (along with optional corresponding output enable signals). In addition, each FB 200 selectively receives global set/reset signals and global clock signals on global set/reset lines 402 and global clock lines 403, respectively. The function and use of these global signals are discussed below.

Figure 2A:
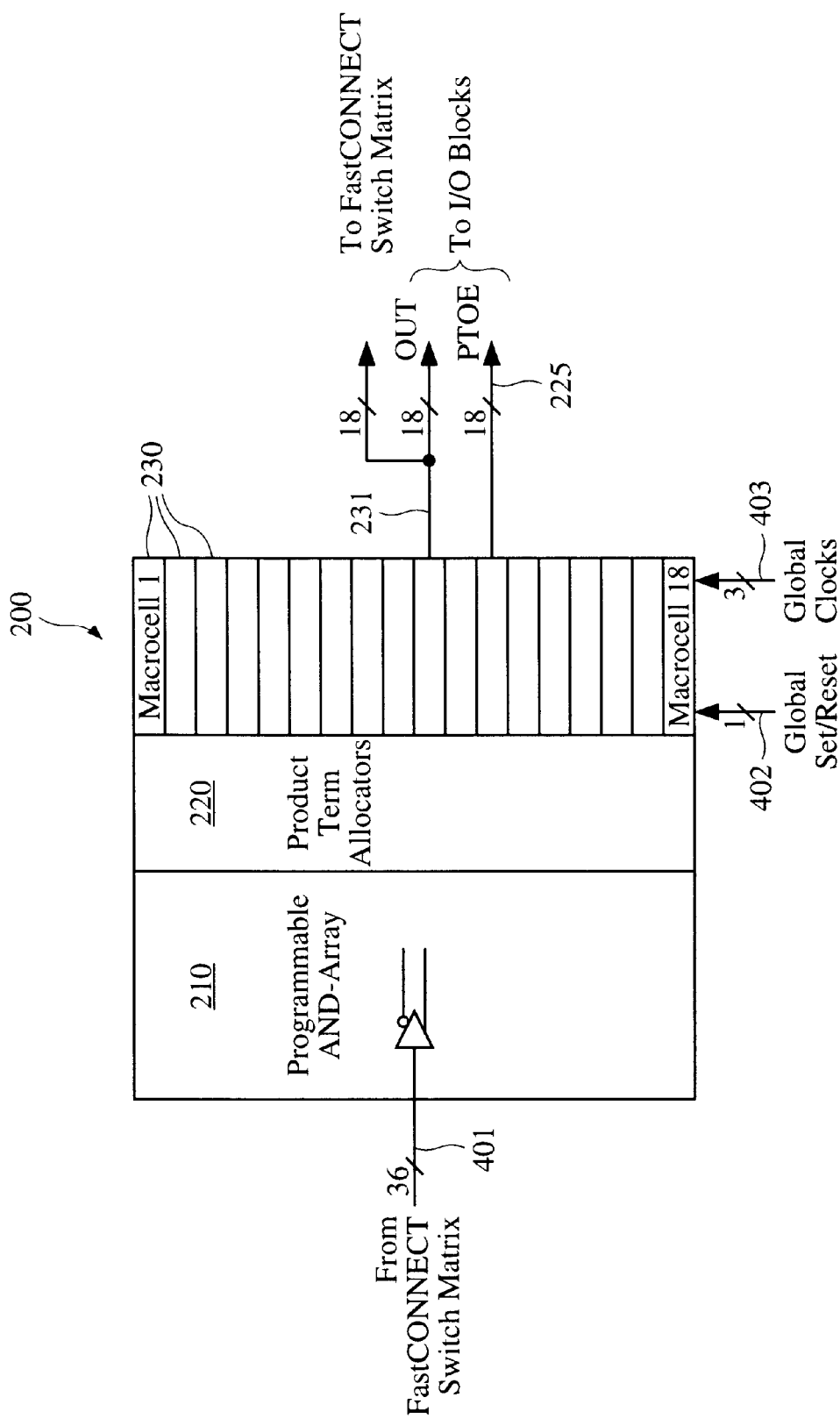
FIG. 2A is a simplified block diagram of a function block of the XC9500 CPLD family.

FIG. 2A shows a simplified block diagram of an FB 200. Each FB 200 includes an AND array 210, product term allocators 220 and eighteen macrocells 230. The AND array 210 receives thirty-six (36) signals on input lines 401 from the FSM 400 and generates ninety (90) P-term elements which are routed to the macrocells 230 through the product term allocators 220. The product term allocators 220 selectively route the P-term elements to the macrocells 230. Outputs from the macrocells 230 are then routed back to the FSM 400 on macrocell output lines 231 for use as input signals in other FBs 200, or are routed to corresponding I/O pins 310 through the I/O modules 300 along with optional corresponding output enable (OE) signals, which are transmitted on P-term OE lines 225.

Figure 2B:
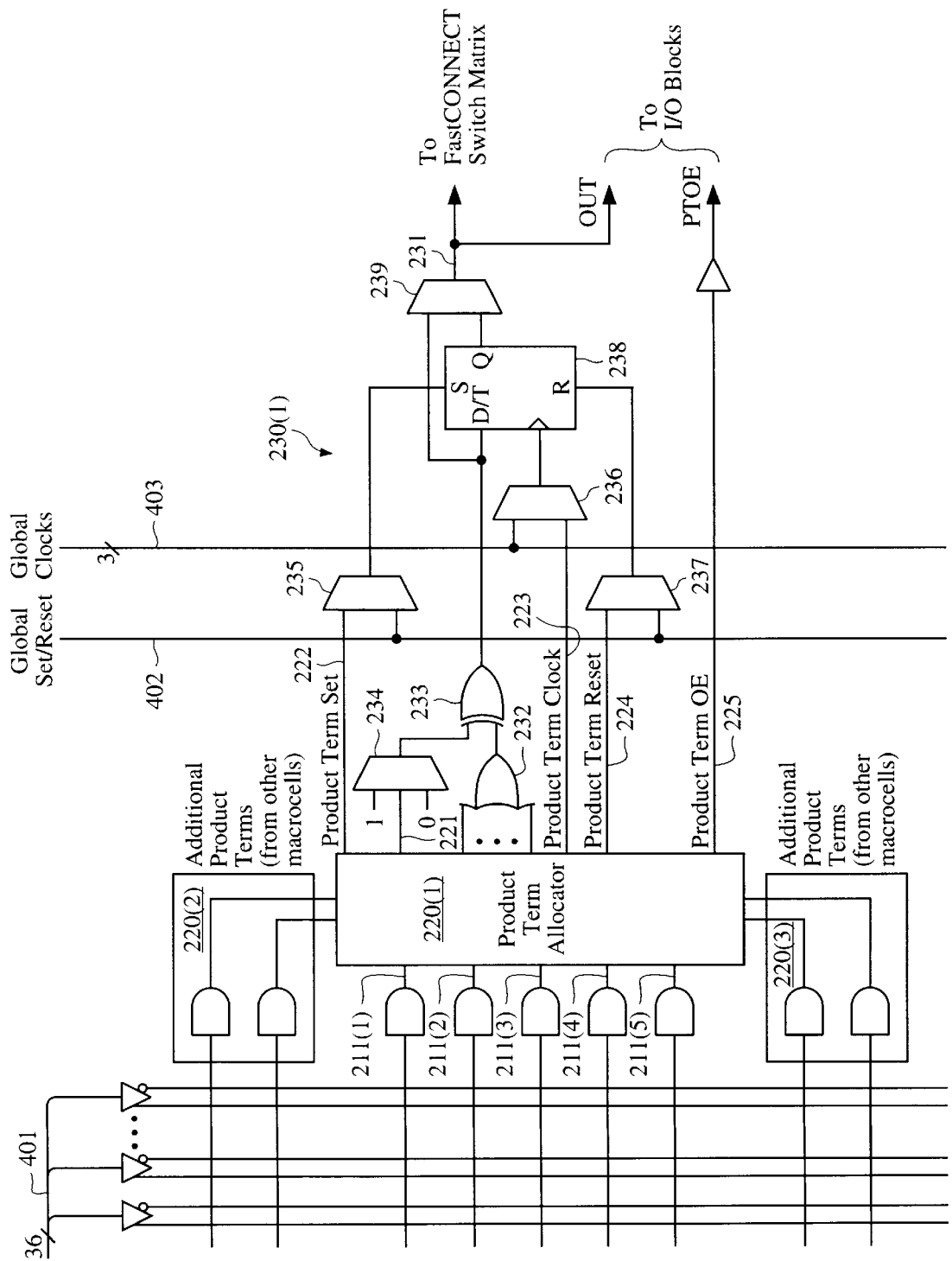
FIG. 2B is a simplified schematic diagram illustrating a macrocell of the function block shown in FIG. 2(A)

FIG. 2B shows a portion of an FB 200 including a macrocell 230(1). As indicated in FIG. 2B and discussed further below, the product term allocator 220(1) programmably connects five direct P-term elements 211(1) through 211(5) to provide the various P-term signals used by macrocell 230(1). In particular, these direct P-term signals are selectively applied to the OR gate 232, the XOR gate 233 (on XOR MUX line 221 and through XOR MUX 234), to the set MUX 235 (on P-term set line 222), to the clock MUX 236 (on P-term clock line 223), and to the reset MUX 237 (on P-term reset line 224). Product term allocator 220(1)

also selectively provides the optional OE signal (on P-term output-enable line 225). In addition, the product term allocator 220(1) selectively applies "imported" P-term elements from neighboring product term allocators 220(2) and 220(3) to the OR gate 232. Details of the product term allocator 220(1) are provided below.

The XOR MUX 234 programmably applies the signal on XOR MUX line 221, a logic "1", or a logic "0" to the XOR gate 233. In addition, the OR gate 232 generates a sum-of-products term which is applied to the second input of XOR gate 233. The output of the XOR gate 233 is selectively transmitted through D/T flip-flop (D/T FF) 238 and FF MUX 239 as a registered output signal on macrocell output line 231, or directly through FF MUX 239 as a combinatorial output. The remaining P-term elements selectively provide optional control signals for the D/T FF 238 (when a registered output signal is generated), and/or provide optional OE control (when the output is directed to an I/O pin 310). Specifically, the set MUX 235 selectively passes the signal on P-term set line 222 or a global set signal (received on one of the global set/reset lines 402) to the set (S) terminal of D/T flip-flop 238. The clock MUX 236 selectively passes the signal on P-term clock line 223 or a global clock signal (received on one of the global clock lines 403) to the clock (>) terminal of D/T flip-flop 238. The reset MUX 237 selectively passes the signal on P-term reset line 224 or a global reset signal (received on one of the global set/reset lines 402) to the reset (R) terminal of D/T flip-flop 238. Finally, as discussed above, the P-term OE line 225 is directed to the I/O modules 300 (see FIG. 1).

Figure 2C:
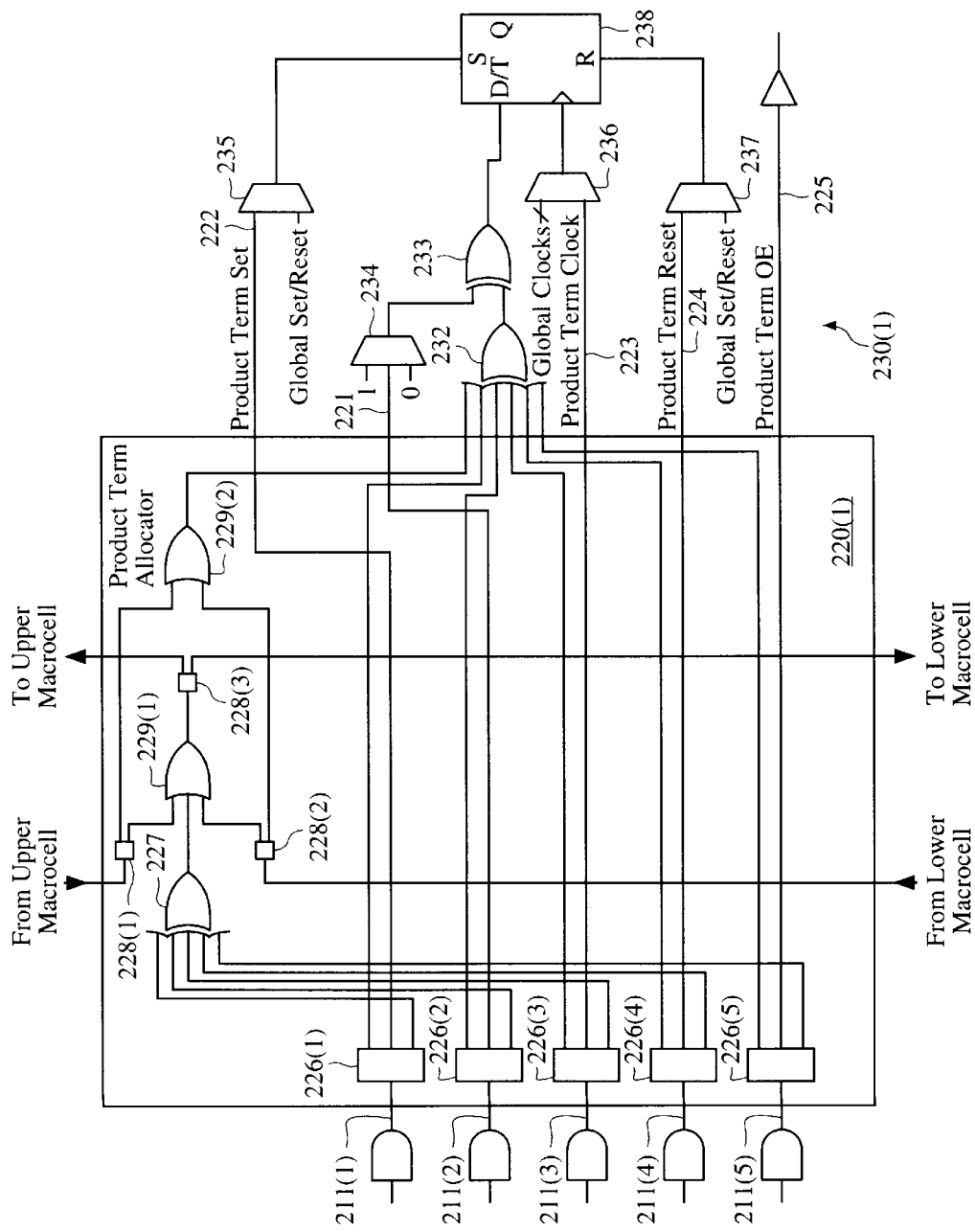
FIG. 2C is a simplified schematic diagram illustrating a product term allocation circuit of the function block shown in FIG. 2A.

FIG. 2C is a simplified diagram showing the internal logic of the product term allocator 220(1). P-term elements 211(1) through 211(5) are respectively coupled to de-multiplexers (DMUXs) 226(1) through 226(5). DMUXs 226(1) through 226(5) are programmable to route their associated P-term signals to any one of three lines: an input of an OR gate 227 of the product term allocator 220(1), an input of the OR gate 232 of the macrocell 230(1) associated with the product term allocator 220(1), or an associated local P-term line (respectively, XOR MUX line 221, P-term set line 222, P-term clock line 223, P-term reset line 224, and P-term OE line 225).

P-term signals selectively transmitted by DMUXs 226(1) through 226(5) to the OR gate 227 are referred to herein as "exported" P-terms because these P-term signals are transmitted to other macrocells. Specifically, the P-term signals provided by DMUXs 226(1) through 226(5) to the OR gate 227 are "ORed" to produce a sum-of-products term which is applied to the OR gate 229(1). The OR gate 229(1) selectively "ORs" this sum-of-products term with terms received from either or both adjacent product term allocators 220(2) and/or 220(3) (see FIG. 2B) which are received through a DMUX 228(1) and/or a DMUX 228(2), respectively. The output signal of the OR gate 229(1) is then routed through a DMUX 228(3) to either of the adjacent product term allocators 220(2) or 220(3) (see FIG. 2B). As discussed below in additional detail, by selectively combining (ORing) selected P-term elements using the OR gates 227 of the product term allocator 220, it is possible to implement sum-of-products terms having up to ninety (90) P-terms.

There are two power settings for each macrocell: high (default) and low. In the XC9500 family, power can be controlled separately at the AND-term (product) level and the OR-term level.

Figure 2D:
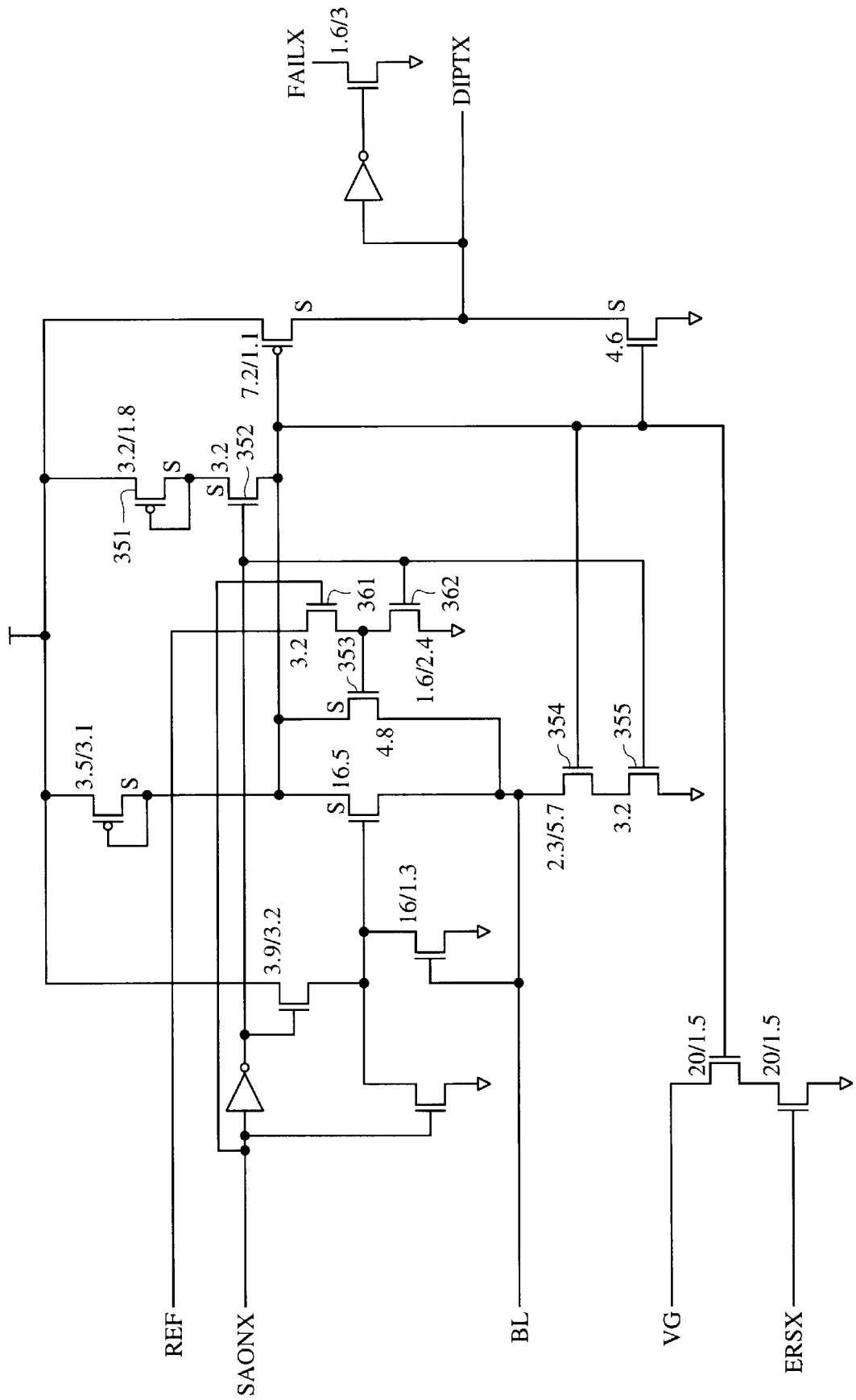
FIG. 2D is a simplified schematic diagram of the power control at the AND-term level.

Power consumption at the AND-term level is controlled by a bit SAONX, shown in FIG. 2D, which controls a leaker path for a sense amplifier. Specifically, if bit SAONX is low (logic zero), then the path including transistors 351, 352, 353, 354, and 355 (path 1) is activated and acts as the leaker path for the sense amplifier. On the other hand, if bit SAONX is high, then the path including transistors 361, 362, and 355 (path 2) is activated and acts as the leaker path. Path 2 consumes significantly less power than path 1 because path 2 has three transistors in that path versus the five transistors of path 1 (note that the other transistors in FIG. 2D behave identically in either mode and irrespective of the activated path and therefore are not explained in detail herein). Additionally, the leaker provided by path 2 is supplied with a lower voltage (i.e. reference voltage REF in one embodiment is 2.5V) than the voltage supplied to path 1 (in one case, 4.5V). Thus, power consumption is reduced dramatically in this mode, although at some expense of driving capability or speed of the signal driver.

Figure 2E:
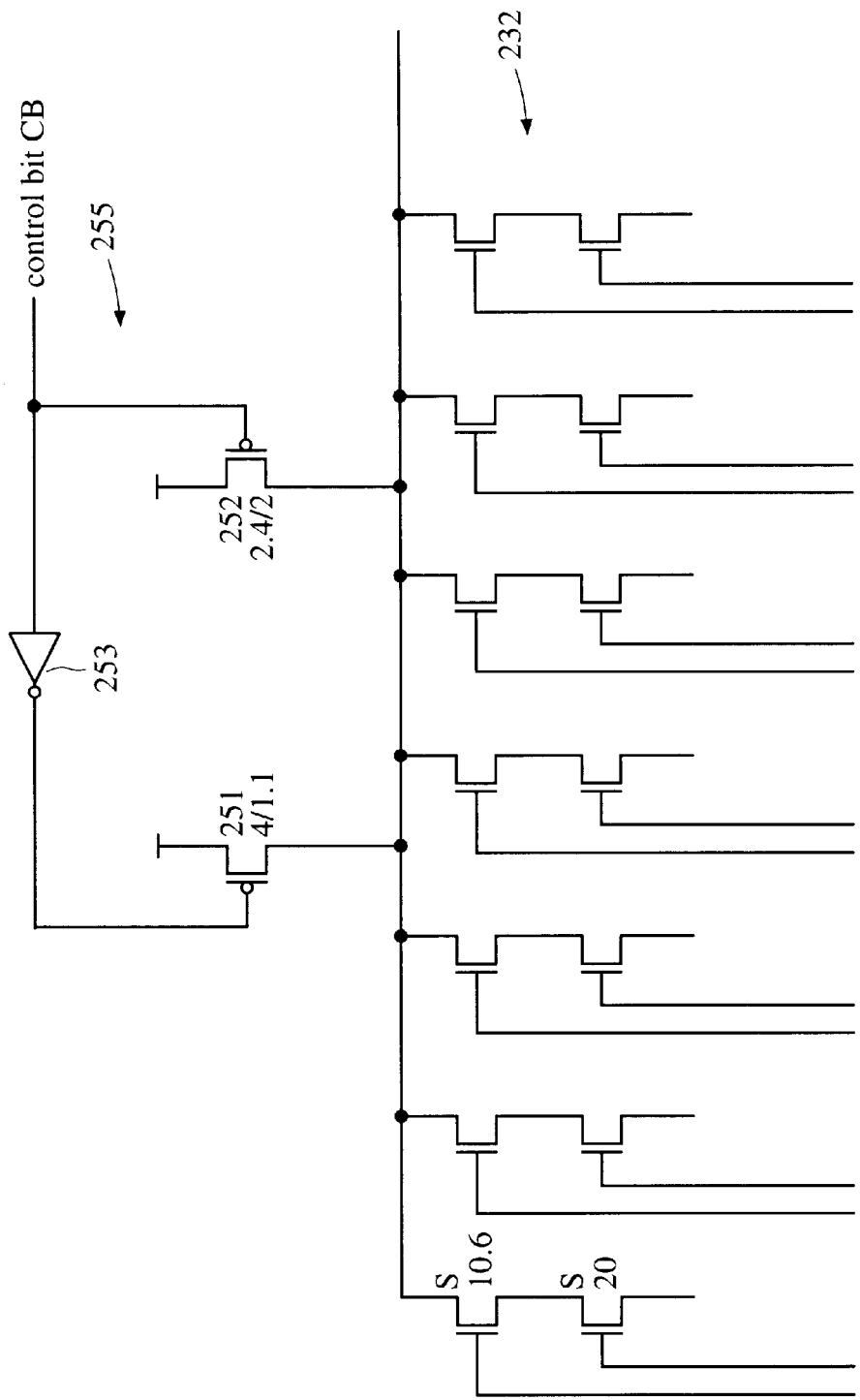
FIG. 2E is a simplified schematic diagram of the power control at the OR-term level.

Power consumption at the OR-term level is controlled by a bit CB shown in FIG. 2E. Specifically, power control circuitry 255 for OR gate 232 (in this embodiment, a seven input NOR gate) is triggered by the control bit CB which turns on either transistor 252 or transistor 251 (via inverter 253). Because of the difference in sizing between transistor 251 (4/1.1) and transistor 252 (2.4/2), transistor 251 (the larger of the two transistors) has more driving capability and generates more current (high power) than transistor 252. In this embodiment, NOR gate 250 is operated in high power mode if control bit CB is a logic one and is operated in low power mode if control bit CB is a logic zero.

Note that the user, however, can control power at the AND-term and OR-term levels using only one switch (i.e., programming one memory bit). In other words, by setting macrocell OR gate 232 for low power operation, all P-term elements programmed to supply input signals to the OR gate 232 (including imported P-terms) are also set for low power operation.

Figure 3:
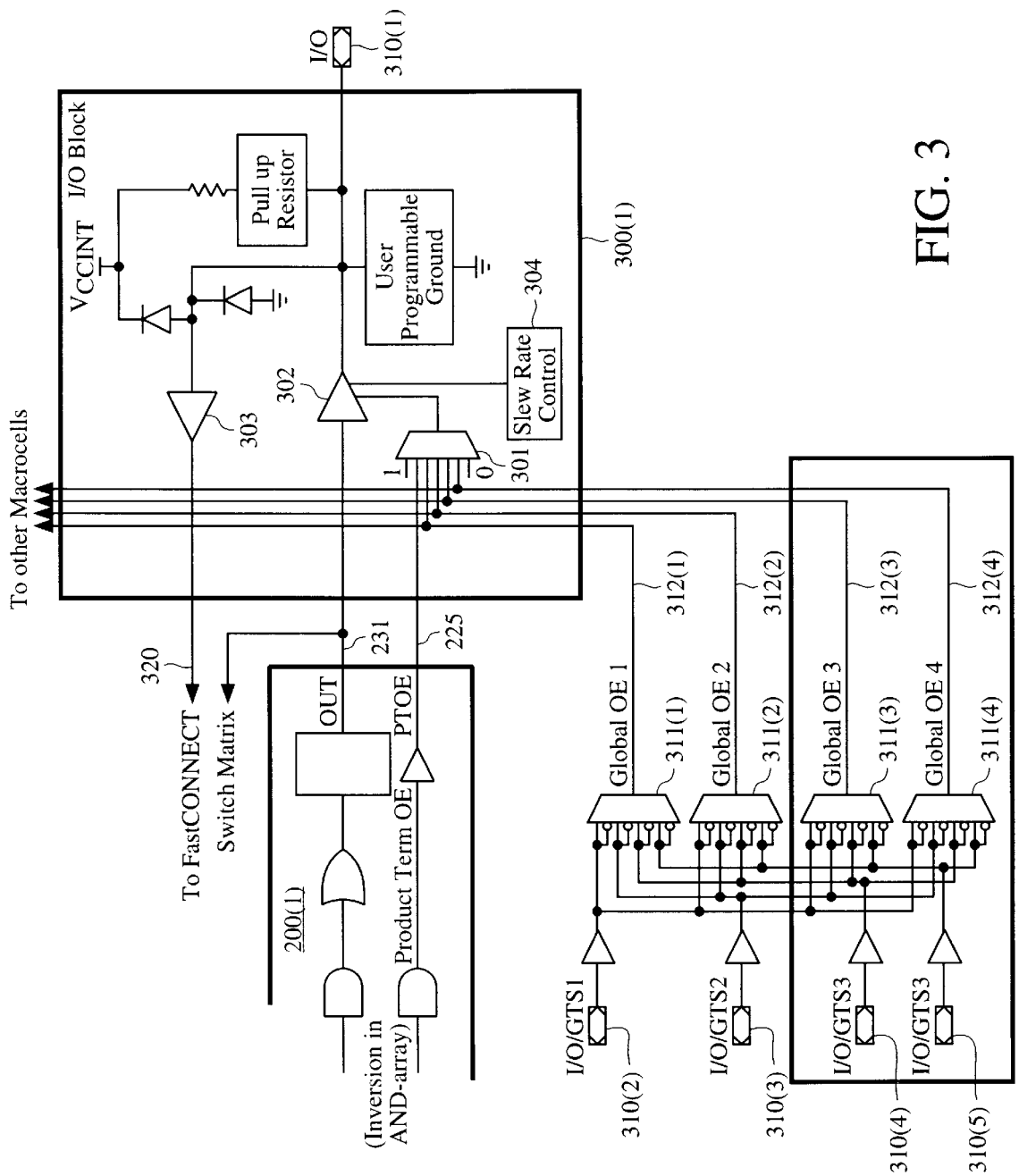
FIG. 3 is a simplified schematic diagram illustrating an input/output module of the CPLD shown in FIG. 1.

FIG. 3 is a simplified circuit diagram showing connections between the function block 200(1) and a corresponding I/O pin 310(1) through a corresponding I/O module 300(1). The I/O module 300(1) includes an output enable (OE) MUX 301 through which an OE signal, provided by the P-term OE line 225, the global OE lines 312(1) though 312(4), a logic "1" source or a logic "0" source, is applied to the control terminal of a tri-state buffer 302. The global OE lines 312(1) through 312(4) are respectively driven by the global OE MUXs 311(1) through 311(4), which in turn receive signals from special I/O pins 310(2) through 310(5). When the applied OE signal enables the tri-state buffer 302, a function block output signal on output line 231 is applied to the I/O pin 310(1). Note that if the tri-state buffer 302 is turned off, input signals applied to the I/O pin 310(1) are transmitted to the FSM 400 (see FIG. 1) on FSM input lines 320 through amplifier 303. Each I/O pin of an XC9500 device can be operated in either a fast slew or a slow slew mode by setting a slew rate control 304.

Figure 3A:
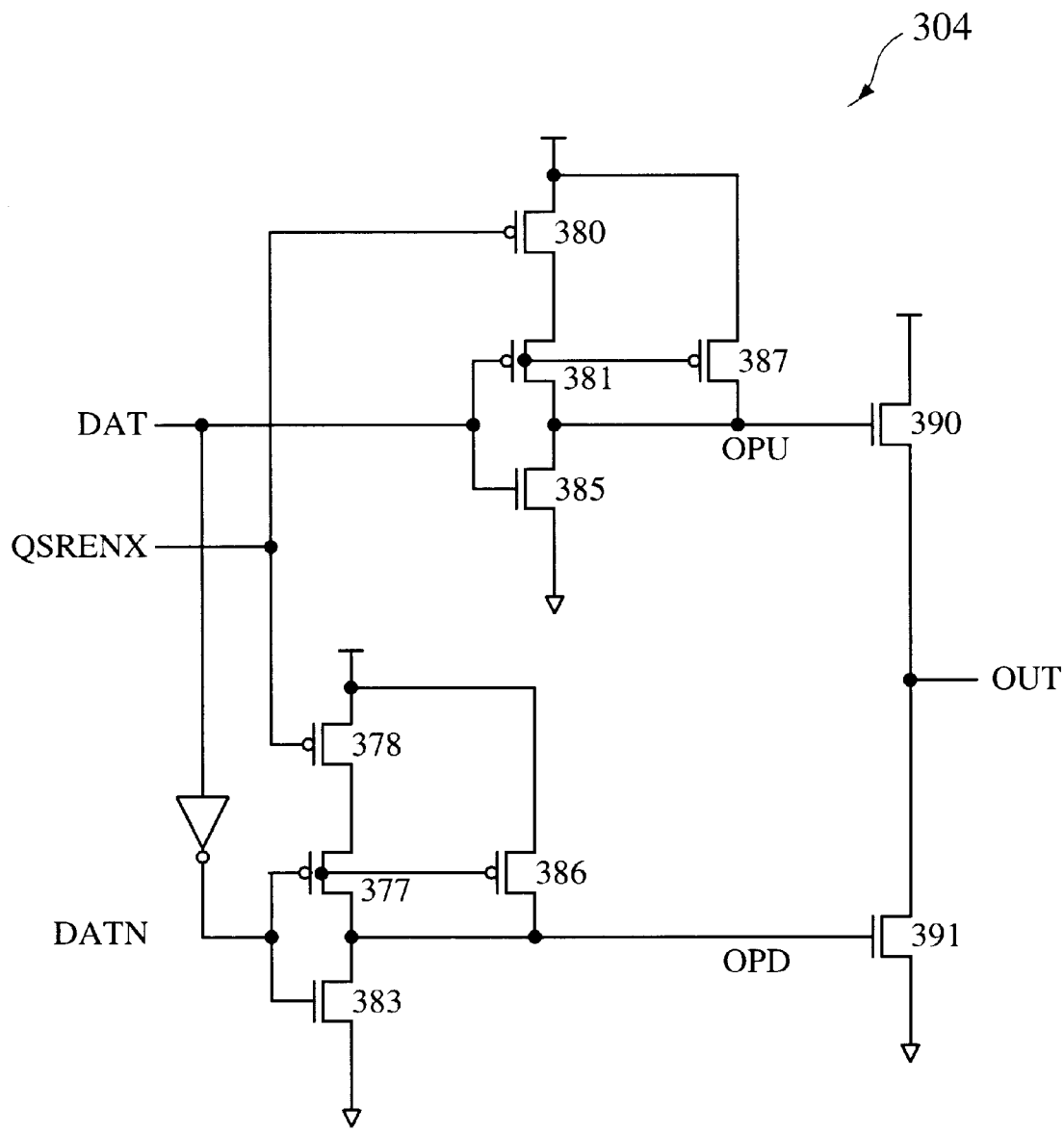
FIG. 3A shows one embodiment of a slew rate control.

FIG. 3A shows one embodiment of slew rate control 304 in which data signals DAT and DATN are inverted and then transferred to lines OPU and OPD, respectively. For example, if data signal DAT is high, then transistors 381, 387, and 383 are turned off, whereas transistors 385, 377, and 386 are turned on, thereby providing a low signal on line OPU and a high signal on line OPD. Signal QSRENX controls the slew rate. Specifically, if signal QSRENX is high (logic one), then transistors 380 and 378 are turned off, thereby providing a first slew rate (and resultingly turned off/on transistors 390 and 391 based on that rate). In contrast, if signal QSRENX is low (logic zero), then transistors 380 and 378 are turned on, thereby sending more current to lines OPU and OPD and resulting in a faster slew rate. Operating in a slow slew rate has the advantage of reducing the electrical noise at the output line OUT, but it comes at the expense of additional delay.

Figure 4:
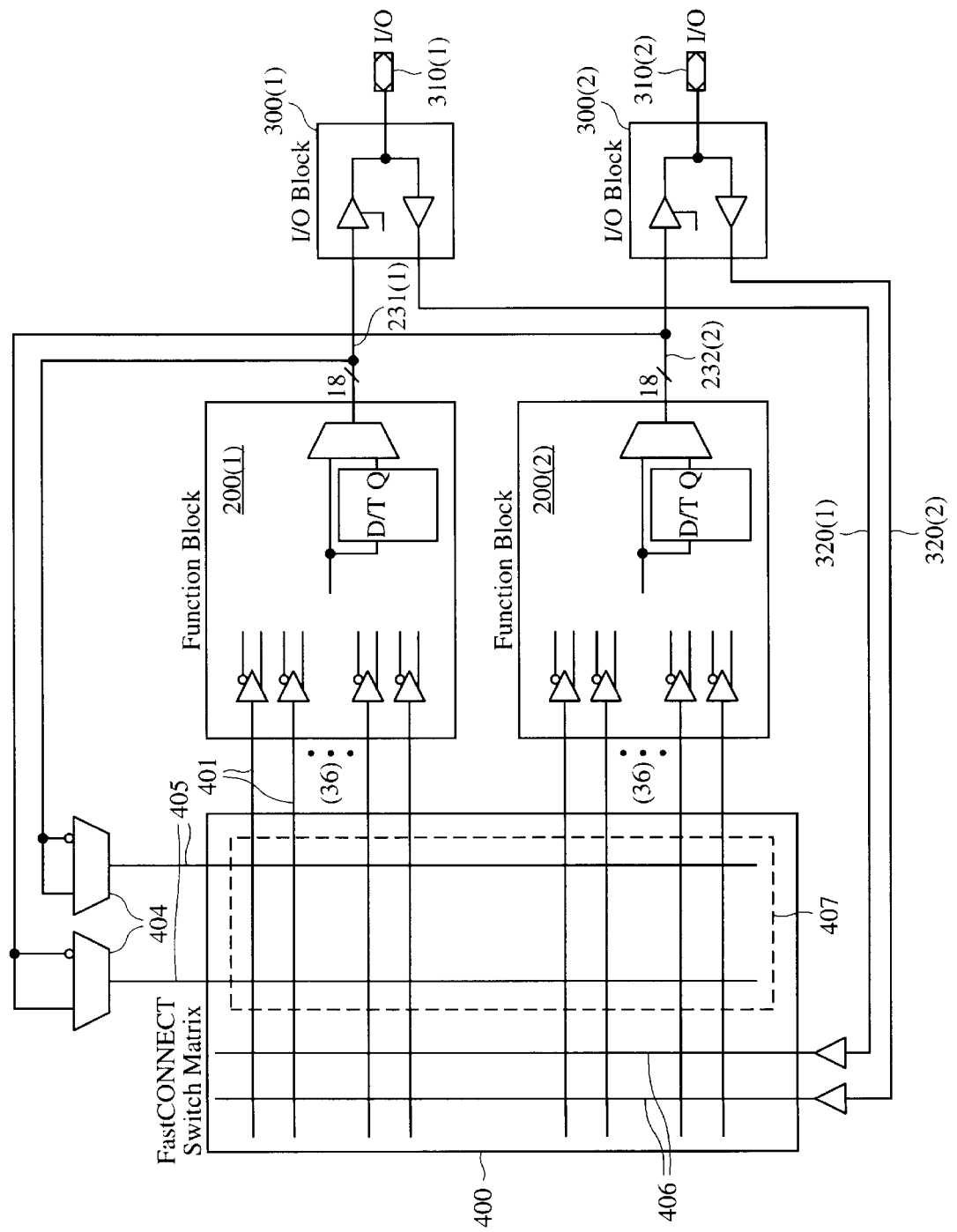
FIG. 4 is a simplified schematic diagram illustrating an interconnect matrix of the CPLD shown in FIG. 1.

FIG. 4 is a simplified circuit diagram showing connections between the function blocks 200(1) and 200(2), the I/O modules 300(1) and 300(2), and the FSM 400. An FSM input MUX 404 is connected to each of the macrocell output lines 231(1) and 231(2). The FSM/macrocell input lines 405 carry FSM input signals (true or compliment, depending upon the programmed state of the FSM input MUX 404) from the macrocells 230(1) and 230(2). Similarly, input signals from the I/O modules 300(1) and 300(2) are respectively entered into the FSM 400 on FSM input lines 406. All of the FSM/macrocell input lines 405 and the FSM input lines 406 are programmably connected to each of the FSM output lines 401. In addition, the FSM 400 includes wired-AND 407 which ANDs together two or more signals entering the FSM 400 on FSM/macrocell input lines 405.

Definitions

To facilitate the description of the key concepts associated with the optimization method of the present invention, the following definitions and graphic representations are adopted.

As used herein, the terms "resource", "logic resource" and "interconnect resource" refer to the elements and interconnect lines of a PLD which are programmable to implement a user's logic function. For example, each function block 200 of an XC9500 CPLD is programmable to implement a portion of a user's logic function which is representable in a sum-of-products form. Therefore, in the context used herein, each function block 200 of an XC9500 CPLD meets the definition of a logic resource of a CPLD. For convenience, the term "logic resource" is also used to refer to I/O modules 300. Similarly, the programmable interconnect lines associated with the function blocks 200, the I/O modules 300, and the FSM 400 meet the definition of interconnect resources of a CPLD. The term "resource" encompasses both logic resources and interconnect resources. Further, as known to those of ordinary skill in the art, other types of PLDs such as field programmable gate arrays (FPGAs) implement logic functions using different types of logic elements (for example, look-up tables) and interconnect schemes. The term "resource" is intended to also cover these different types of logic elements and interconnect schemes.

As used herein, the term "logic portion" refers to the portion of a user's logic function implemented by a logic resource of a PLD. For example, as described above, up to ninety (90) P-term elements of a given function block 200 are usable by a single macrocell by programming the product term allocator 220 to connect the five assigned P-term elements of the macrocell 230 and the eighty-five (85) remaining P-term elements of the function block 200 to the OR gate 232 of the macrocell 230. As such, each macrocell 230 of an XC9500 CPLD is programmable to implement a small or large logic portion of a user's logic function which is representable as a sum-of-products term. Therefore, in the context used herein, each sum-of-products term (made up of a number of P-terms fed to the OR gate 232 of a macrocell 230) meets the definition of a "logic portion".

As used herein, the term "node" refers to a specific region of a PLD, and specifically to a logic resource of a PLD. In the following description and examples, the term "node" is specifically used in conjunction with an I/O module 300 or a macrocell 230 of an XC9500 CPLD. However, other types of PLDs use different types of I/O and logic elements (for example, dedicated input and output modules). The term "node" is intended to also cover these different types of PLD elements.

As used herein, the term "placing" refers to the process of assigning each sum-of-products term to a specific logic resource (e.g., a macrocell 230 of a function block 200) of a target PLD, and the term "routing" refers to the process of assigning interconnect resources of the target PLD to connect the logic resources such that the sum-of-products terms collectively emulate the user's logic function.

As used herein, the term "path" refers to a collection of PLD resources which are programmably connected in series to form a route along which signals pass from a first node to a second node in a target PLD. A portion of each path implemented using interconnect resources passing between two logic resources is referred to as a "segment". As described further below, paths may share segments with other paths. A first type of path passes signals from an input pin to an output pin of the PLD, typically along interconnect resources (such as the FastConnect™ matrix utilized in the XC9500 family of CPLDs) and through one or more logic resources. A second type of path passes signals from an input pin to the flip-flop of a logic resource. A third type of path passes signals from the flip-flop of a first logic resource to the flip-flop of a second resource. A fourth type of path passes signals from the flip-flop of a logic resource to an output pin.

As used herein, the term "actual delay" refers to the amount of time required for a signal to pass between two nodes in a target PLD. As is known to those of ordinary skill in the art, the actual delay of a signal depends upon the route taken by the signal through the interconnect and logic resources of the target PLD. For example, a signal passing between two macrocells along "local" interconnect resources (i.e., interconnect lines specifically designed to avoid feedback through a general interconnect matrix) typically travels faster than if the signal passes through the interconnect matrix. It is possible to calculate the actual delay of a path or segment by identifying the resources through which the path/segment passes, and comparing the identified resources with known benchmark delay times associated with those resources.

As used herein, the term "timing specification" or "timespec" refers to a user-defined timing constraint placed upon a path or segment of the user's logic function. A timespec path has "slack" when its actual delay is less than its user-assigned timing specification. For example, the user may assign a timing specification to some or all pin-to-pin paths of a logic function of 90 nanoseconds. This time spec constrains the place and route software to determine a place and route solution in which the specified pin-to-pin paths have an actual delay of 90 nanoseconds or less. If the actual delay is, for example, 80 nanoseconds, then the path has a slack of 10 nanoseconds. If the place and route software cannot provide a solution meeting the timing specifications of all timespec paths, then the user must either "relax" the timing specifications (e.g., change the timing specification from 90 nanoseconds to 100 nanoseconds or more), or must consider using another PLD (or ASIC).

Figure 5:
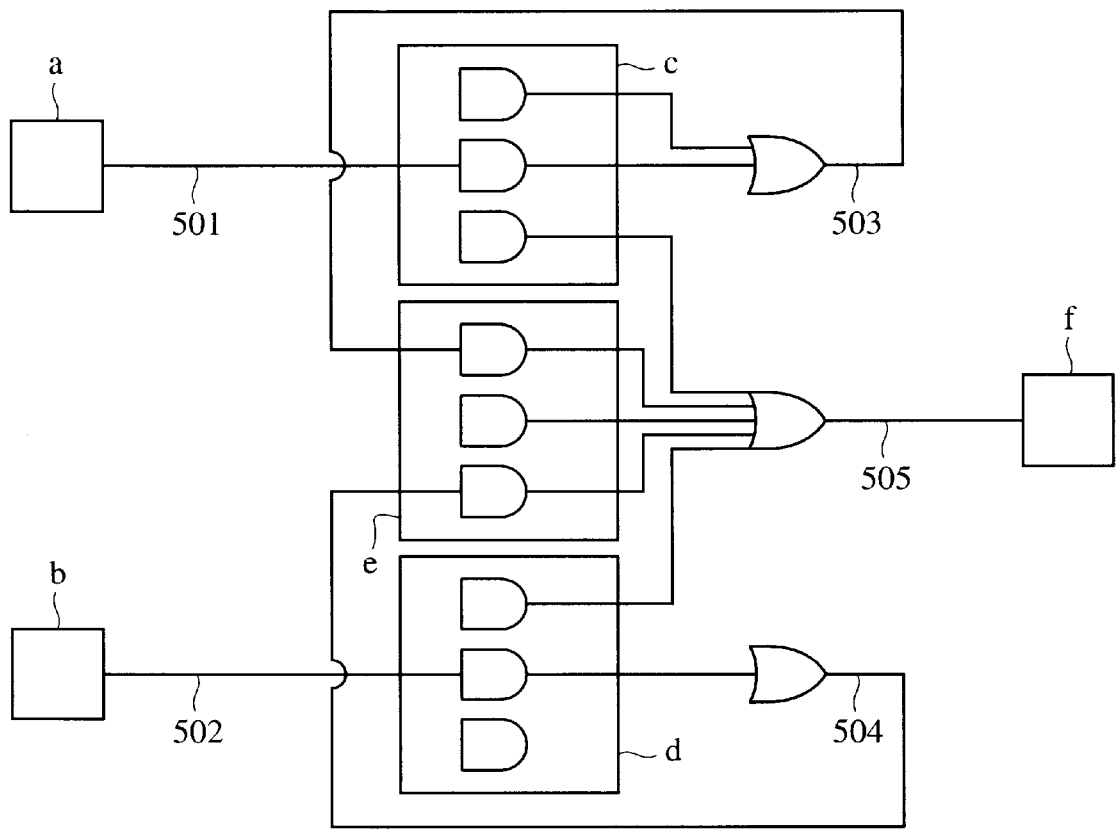
FIG. 5 is a simplified block diagram showing a portion of a PLD programmed to implement a logic function.
Figure 6:
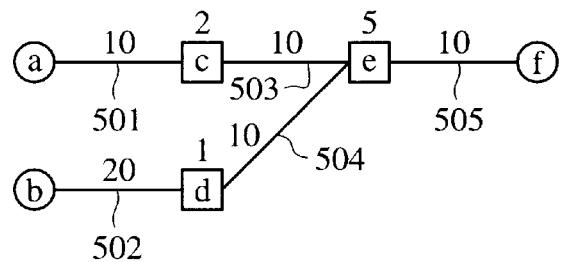
FIG. 6 is a simplified graphical representation of the block diagram shown in FIG. 5.

FIGS. 5 and 6 introduce a simplified graphical representation utilized in the following description.

FIG. 5 shows a simplified version of a PLD including input blocks a and b, Macrocells c, d and e, and output block f (wherein "Macrocell" collectively refers to the product term allocator and a macrocell). In this embodiment, each of Macrocells c, d and e include three assigned P-terms (represented in FIG. 5 as AND gates) which may be exported to adjacent Macrocells. In particular, Macrocell c utilizes two P-terms and exports one P-term to Macrocell e. Similarly, Macrocell d utilizes one P-term and exports one P-term to Macrocell e (one P-term of Macrocell d remains unused). Finally, Macrocell e utilizes five P-terms (the three P-terms specifically assigned to Macrocell e, and one P-term from each of Macrocells c and d). One of the two P-terms applied to the OR gate of Macrocell c is transmitted from input block a on line 501 (the other P-term arrives from an unillustrated resource of the PLD). Similarly, one of the three P-terms received by Macrocell d is transmitted from input block b on line 502. The outputs from Macrocells c and d are transmitted to respective inputs of Macrocell e on lines 503 and 504. Finally, the output from Macrocell e is transmitted to output block f on line 505.

FIG. 6 is a simplified representation showing the placement and routing solution of FIG. 5. Input blocks a and b and output block f are represented by circles, and Macrocells c, d and e are represented by squares. The numbers "2", "1" and "5" located over Macrocells c, d and e represent the number of P-terms utilized by these Macrocells, respectively. Signal lines (segments) 501 and 502 are drawn between input block a and Macrocell c, and between input block b and Macrocell d, respectively. The numbers "10" and "20" respectively located above segments 501 and 502 represent actual delay times for these segments (the time units are arbitrary for explanatory purposes). Segments 503, 504 and 505 are indicated as having actual delay times of 10 each.

The following simplified example is provided to introduce concepts used in the following discussion.

Assume the path from input block a to output block f (path a–f) and the path from input block b to output block f (path b–f) represent two timespec paths of a user's logic function having a common timing specification of 40 time units. The actual delay for path a–f is 30 (adding segments 501, 503 and 505), thereby leaving path a–f a slack of 10. Path b–f has an actual delay of 40, leaving a slack of zero.

Assume further that changing any of Macrocells c, d and e from fast (high power) operation mode to slow (low power) operation mode introduces an additional delay of 10. Under this condition, the only Macrocell in either of paths a–f or b–f which can be changed from fast to slow mode is Macrocell c—if either of Macrocells d or e are changed to slow mode, the additional delay would violate the timing specification on path b–f.

Assume also that changing output block f from fast slew mode to slow slew mode introduces an additional delay of 10 time units. Even though changing output block f from fast slew mode to slow slew mode would not violate the timing specification on path a–f (assuming path a–f has a slack of 10 or more), the timing specification on path b–f would be violated. Therefore, it is not possible to operate the portion of the PLD implementing these paths in slow slew mode.

Implementation Options

There are three possible points of the PLD programming process during which power/slew optimization techniques may be implemented: pre-placement optimization, placement optimization, and post-placement optimization.

Pre-placement optimization takes place before physical resources are assigned to each path of the logic function (i.e., during partitioning). For example, pre-placement optimization utilizes logic optimization techniques at the synthesis and technology mapping stages to, for example, reduce the number of P-terms of the user's logic function, thereby reducing the number of actual resources drawing power during operation of the programmed PLD.

Placement optimization utilizes power optimization techniques to determine the best placement and routing strategy for a logic function. For example, routing paths using local feedback resources instead of routing through an interconnect matrix may reduce power consumption. Further, an entire function block may be powered down if the user's logic function is fully implemented in other resources of the PLD.

Post-placement optimization takes place after all other steps of the PLD programming process have been completed (i.e., after all of the paths have been placed), and consists of selectively powering down Macrocells and switching I/O modules to slow slew operation (provided the timespecs of paths passing through these resources are not violated).

The present invention, as described below, is directed to post-placement optimization.

Assuming that slowing down the slew rate and operating a Macrocell in low power mode cause some additional delays, the object of the present invention is to optimize all paths with timespecs to reduce noise and power dissipation without violating the timespecs. The number of P-terms incorporated in a path is a good relative measure for the dissipation of power because the delay caused by operating a Macrocell in low power mode is the same regardless of the number of P-terms assigned to that Macrocell, and the total power dissipation is lower for Macrocells utilizing more AND-gates in low power mode. This is better illustrated with the help of the example shown in FIGS. 5 and 6.

Referring again to FIG. 5, the simplified diagram shows three adjacent Macrocells c, d and e of a PLD. As discussed above, the OR gate of each Macrocell can utilize more than its associated number of P-terms (three in this example) by importing one or more P-terms from adjacent Macrocells. For instance, Macrocell e imports one P-term from Macrocell c, and one P-term from Macrocell d. As also discussed above, when a Macrocell is powered down, every P-term associated with the signal at the output of that Macrocell is also powered down. In the example shown in FIG. 5, Macrocell e, which utilizes five P-terms, is a better candidate for power reduction than either of Macrocell b (two P-terms) or Macrocell d (one P-term) because a larger number of P-terms (AND-gates) are powered down by powering down Macrocell e. The delay of operating any signal in low power is the same. Therefore, assuming only one Macrocell in a timespec path can be powered down without violating its assigned timing specification, power reduction is maximized by powering down the Macrocell in the path which utilizes the greatest number of P-terms.

Programming Method

A CPLD programming method according to the present invention will now be discussed with reference to FIGS. 7 to 13.

System Context of the Invention

Figure 7:
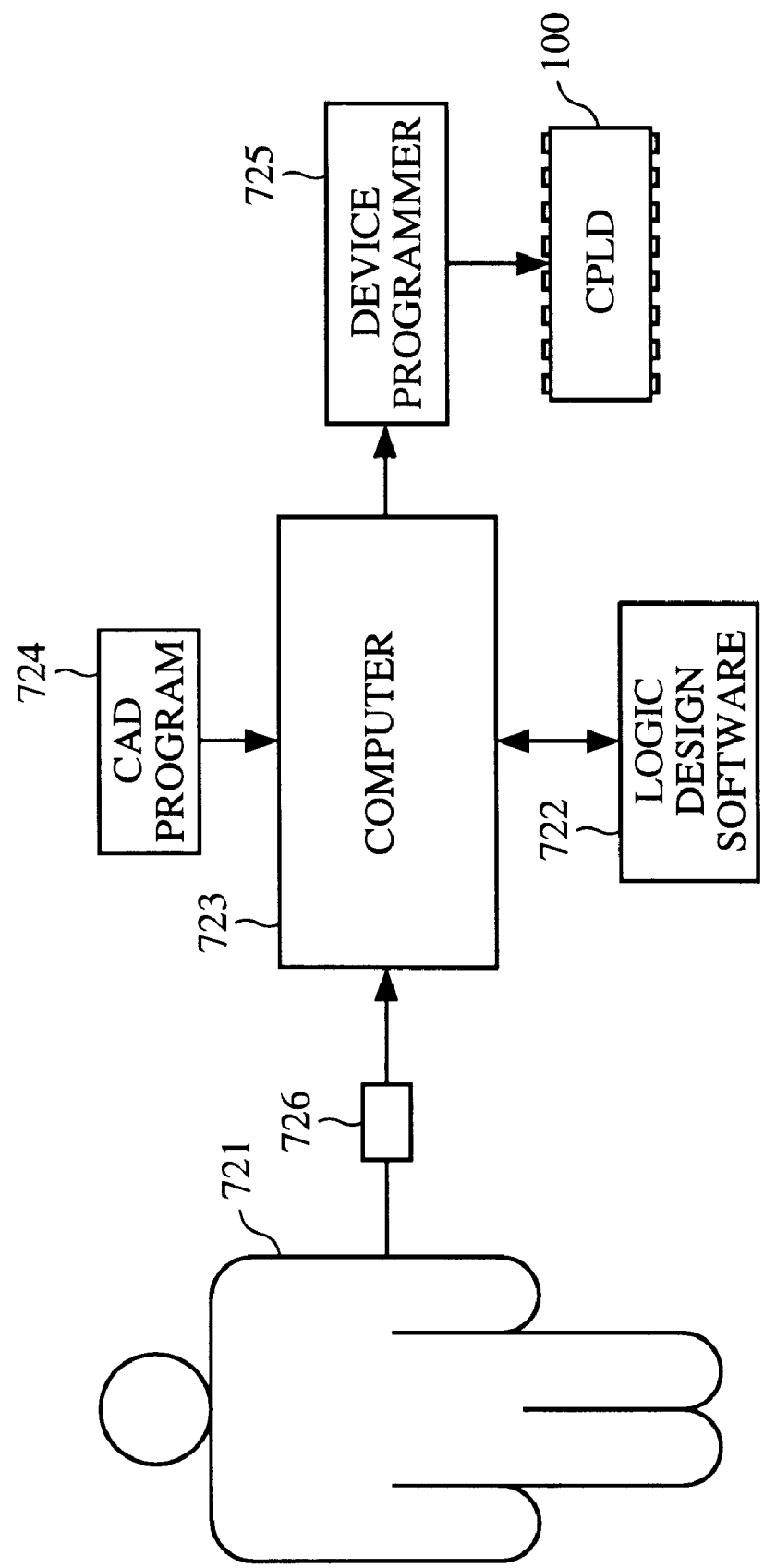
FIG. 7 is a block diagram illustrating a system for programming a CPLD using the power/slew optimization method of the present invention.

FIG. 7 shows a "machine" for programming a CPLD 100 in accordance with the present invention. A human user 721 provides the CPLD 100 to be programmed and specifies the logic function (circuit design) which the CPLD 100 is to implement. Logic design software 722 and CAD software 724 (jointly referred to herein as the "high level program") operating in a computer 723 take the logic function specified by the user 721 with an input device 726 and determine how to "place and route" the logic efficiently onto the CPLD 100, and to perform "optimization" in accordance with the present invention. Logic design software 722 is used to carry out the "place and route" process, and to perform the optimization method steps shown in FIGS. 8–11 and described below. If the specified logic function is represented in a schematic or high-level language format, the logic design software 722 may be used to transform the function from that format to a set of Boolean terms prior to performing the "place and route" process. The set of Boolean terms includes both sequential (registered) terms and combinatorial terms. Such format transformation procedures and "place and route" processes are well known in the art and readily available. The programming method shown in FIGS. 8–11, however, discloses aspects particular to the present invention. The CAD software 724 is used after the logic design software 722, and produces a bit-map file that indicates to a device programmer 725 the values to program into the CPLD 100. This bit-map file, also known as a hex file, is a list of the programmable connections of the AND-array and OR-array of each function block, of the logic expander or interconnect matrix, and other setting of the CPLD 100. The device programmer 725 physically programs the contents of the bit-map file into the CPLD 100. The physical form of the programming or configuring depends on the manufacturing technology of the CPLD 100. If, for example, the CPLD 100 is an EPROM or EEPROM device, the EPROM or EEPROM cells are programmed by charging or discharging a floating gate or other capacitance element. Other PLD devices may be programmed using similar device programmers by blowing fuses. One device programmer 725 that may be used is the HW-130 Programmer available from Xilinx, Inc. of San Jose, California. It connects to computer 723 via an RS232 serial port. A software driver, which is provided for the HW-130 Programmer by Xilinx, Inc., downloads programs and data from the computer 723 to the device programmer 725. Thus, the interacting elements 721–725 of the machine in FIG. 7 carry out a process that reduces the CPLD 100 from an unprogrammed state to programmed state that can carry out the specified logic function.

Power/Slew Control Method

The power/slew optimization method according to the present invention is invoked as a post-placement step after the user's logic function has been placed and routed for a target PLD. The actual delay of all the placed signals has been determined at this stage of the PLD programming process. The optimization method changes the timing of only those paths that have sufficient slack, which is defined above as the difference between the timespec for a particular path and the actual delay of the signal through that path. Paths without timespecs are not considered. However, the portion of these non-timespec paths that overlap with timespec paths may be changed by the optimization process, as described further below.

There are certain pre-conditions that need to be satisfied before the optimization method is invoked. First, the logic function must be successfully placed and routed on the target PLD (i.e., the entire logic function is placed and the actual delay of all timespec paths is less than or equal to their associated timespecs). Second, the power/slew optimization option must be implemented (turned on) by the user. Third, there is a power mode associated with each Macrocell, and slew rate associated with each I/O module—this can be either the default (high power, fast slew) setting or otherwise specified by the user. Fourth, there must be at least one timespec path.

Assuming the above-mentioned pre-conditions are met, the power/slew optimization method according to the present invention will now be explained in detail with reference to the flowcharts in FIGS. 8–11.

Figure 8:
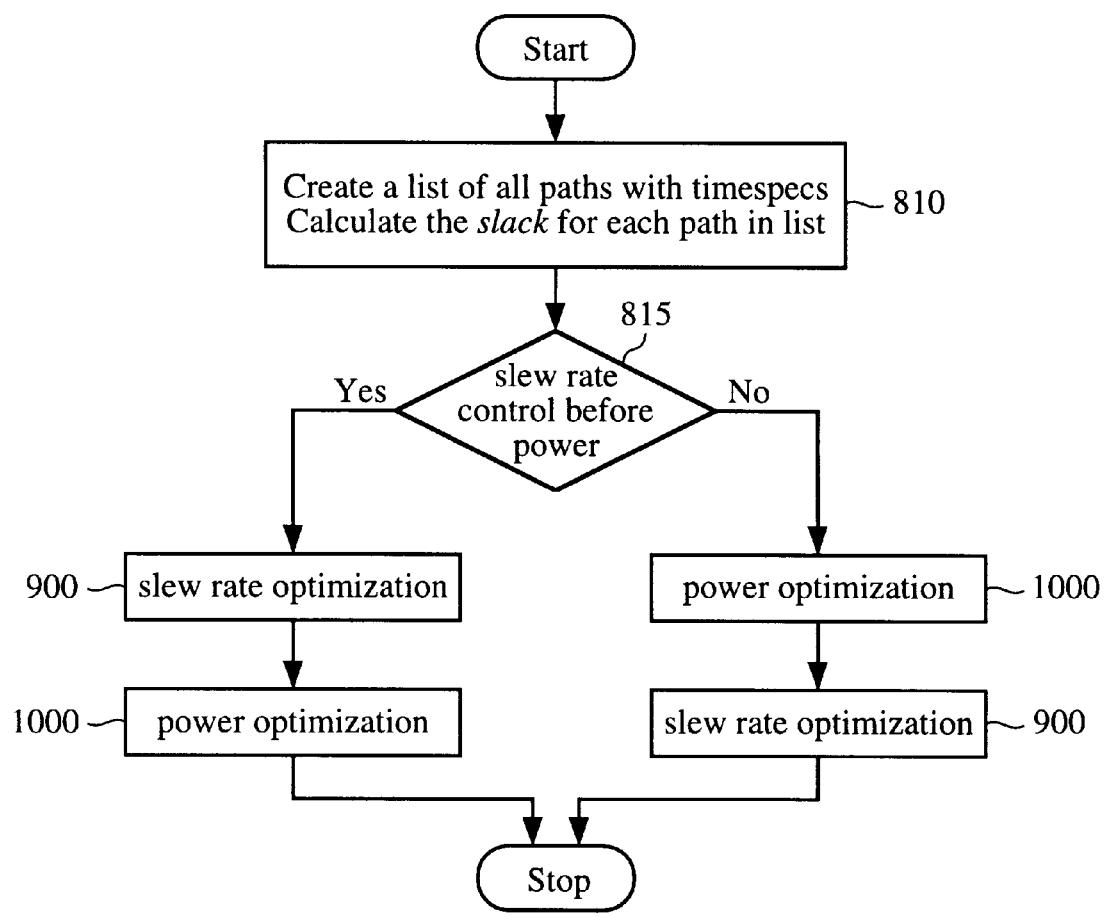
FIG. 8 is a flow diagram showing the basic logic steps of the power/slew optimization method according to the present invention.

Power/Slew Optimization Method Overview (FIG. 8)

FIG. 8 is a flow diagram illustrating the basic logic steps (main process) used in the power/slew optimization method according to the present invention. The main process begins by creating a list of timespec paths and calculating (if not already available) the slack for each path in the list (step 810). Next, the main process queries the user as to the preferred optimization (slew rate control or power control) (step 815). If slew rate control is given a higher priority over power control, the main process implements slew rate optimization (step 900), then power optimization (step 1000). Conversely, if power control is given a higher priority, then the main process implements power optimization (step 1000) before slew rate optimization (step 900). Each of these steps is discussed in additional detail below.

Figure 9:
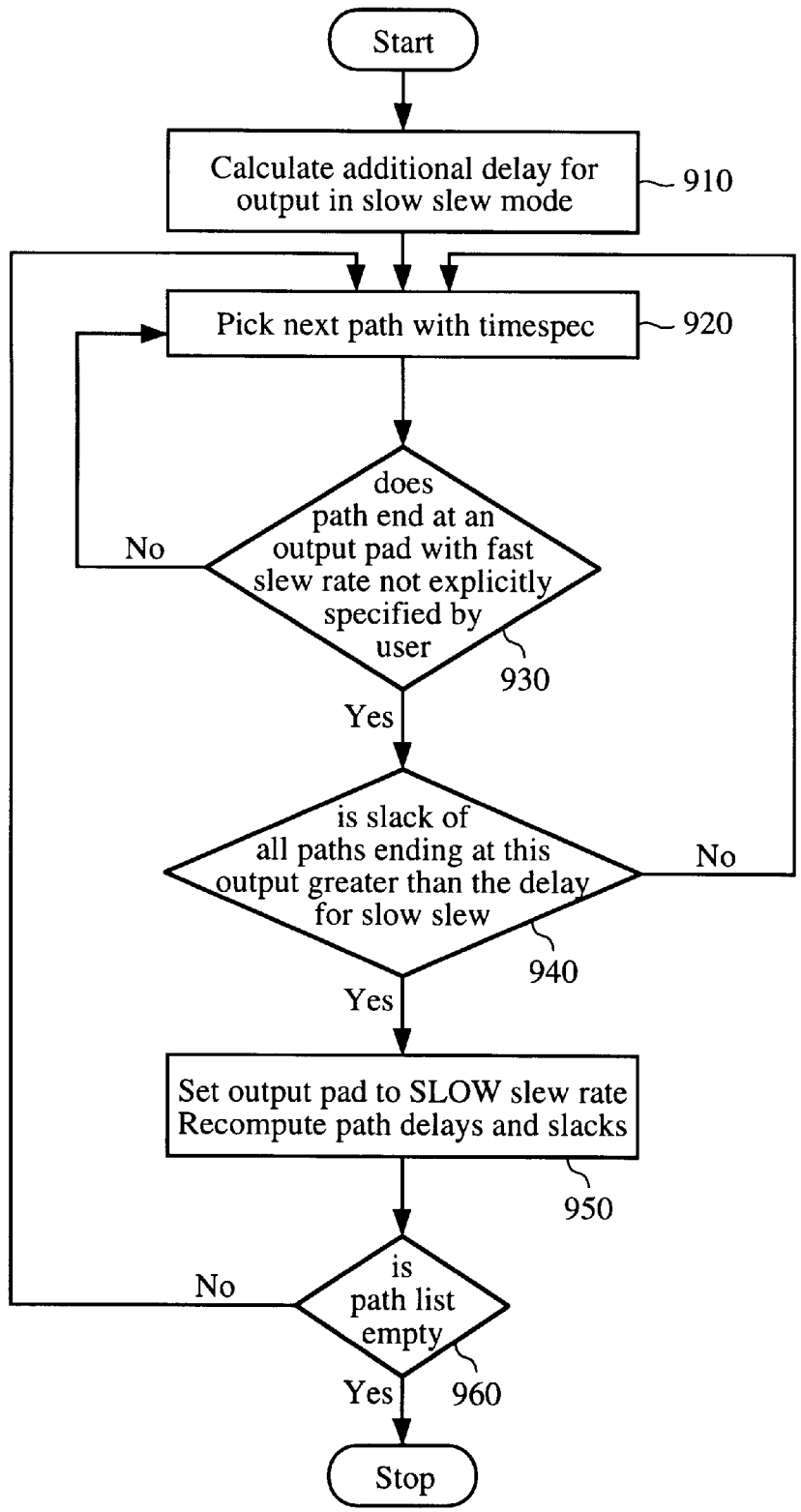
FIG. 9 is a flow diagram showing logic steps associated with slew rate optimization according to the present invention.

Slew Rate Optimization (FIG. 9)

FIG. 9 is a flow diagram illustrating the logic steps used during slew rate optimization (step 900 in FIG. 8).

Before slew rate optimization can be performed, the additional delay caused by switching an I/O module from fast to slow slew operating mode must be determined (step 910). This delay may be estimated from experimental data calculated, for example, from other PLDs from the same family as the target PLD.

After the additional delay is determined, control is passed to step 920 in which a path is selected from a list of timespec paths associated with the user's logic function (non-timespec paths are not considered). Control then passes to step 930.

In step 930, the selected timespec path is then analyzed to determine whether it terminates at an output module (or pin) If so, the timespec path is further analyzed to determine whether the output module at which the path terminates has a slew rate setting specified explicitly by the user, or is already set at a slow slew mode. If the path does not end at an output, or the output cannot be changed from fast to slow slew, then control is passed back to step 920 for the selection of another timespec path from the list. If both tests are satisfied, control passes to step 940.

In step 940, the output module at the end of the selected timespec path is analyzed to determine the effect of switching this output module to a slow slew rate. This analysis is performed both on the selected timespec path, and also on all other timespec paths terminating at the output module. In particular, the slack associated with these timespec paths is compared with the additional delay determined in step 910. If the slack associated with any of these timespec paths is less than the additional delay, then the result of step 940 is negative (No) and control is passed back to step 920 for selection of a new timespec path. If the slack associated with all of these timespec paths is greater than or equal to the additional delay, then the result of step 940 is positive (Yes) and control is passed down to step 950.

In step 950, the output module at the end of the selected timespec path is set to a slow slew rate, and the slacks associated with the selected timespec path (and all other timespec paths ending at the output module) are recalculated. Control then passes to step 960.

In step 960, the list of timespec paths is checked to determine whether all timespec paths have been analyzed. If there are any timespec paths which have not been analyzed (No), then control passes back to step 920 and the above-described process is repeated for any such timespec paths. If all timespec paths have been analyzed (Yes), then slew rate optimization is terminated and control returns to the main process (FIG. 8).

Figure 10:
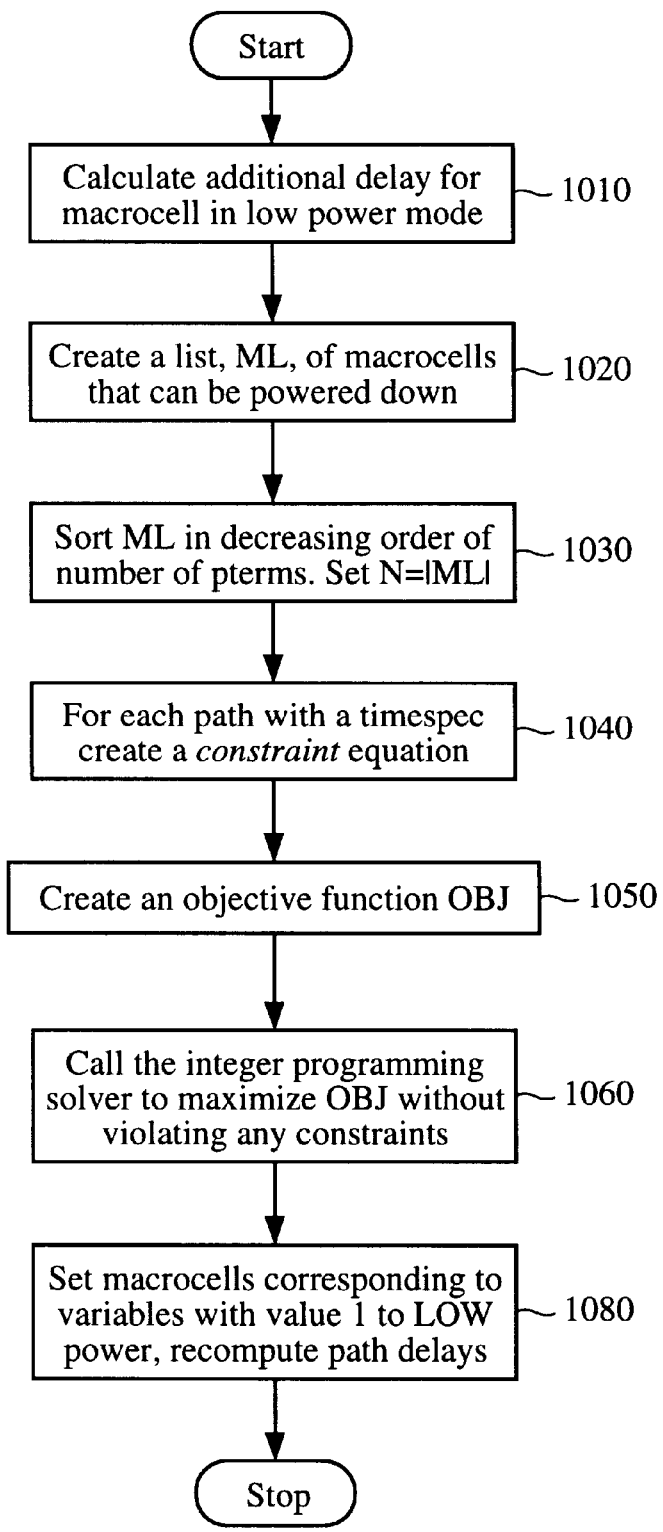
FIG. 10 is a flow diagram showing logic steps associated with power optimization according to the present invention.

Power Optimization (FIG. 10)

FIG. 10 is a flow diagram illustrating the logic steps used during power optimization (step 1000 in FIG. 8).

Before power optimization can be performed, the additional delay caused by switching a Macrocell from high to low power mode must be determined (step 1010). This delay may be estimated from experimental data calculated, for example, from other PLDs from the same family as the target PLD. After the additional delay is determined, control is passed to step 1020.

In step 1020, a list ML is created which includes all Macrocells lying in at least one timespec path. In the present embodiment, any Macrocells which are already in low power mode or have an explicit user power setting are not added to the list ML. Control then passes to step 1030.

In step 1030, the Macrocells in list ML are sorted in decreasing order based on the number of P-terms assigned to each Macrocell. For example, a Macrocell receiving 8 (eight) P-term inputs is placed ahead of a Macrocell receiving 5 (five) P-term inputs. The size of the list ML (i.e., the number of Macrocells) is designated N. Control then passes to step 1040.

In step 1040, a constraint equation having N variables (each variable corresponding to one Macrocell in the list ML) is created for each of the timespec paths. This equation can be thought of as a two-by-two matrix wherein each column represents a particular Macrocell in ML, and each row represents a particular timespec path. Each of the N variables in a row is assigned a coefficient of 1 if its associated Macrocell lies in the path represented by the row, and 0 if it does not. The N variables of a row form the left hand side (LHS) of the constraint equation for the timespec path associated with the row. The right hand side (RHS) of each constraint equation is set equal to the number of Macrocells that can be powered down in that timespec path without violating the timespec of the path. This RHS is computed by taking the floor of the quotient obtained from dividing the slack by the additional delay determined in step 1010. For example, if the slack of a timespec path is 25, and the additional delay for switching a Macrocell to low power is 10, then the RHS of the constraint equation for the timespec path is 2 (i.e., no more than two Macrocells in the timespec path can be switched to low power without violating the path's timespec). In contrast, if the additional delay for switching a Macrocell to low power is 15, then the RHS of the constraint equation for the timespec path would be 1. Control then passes to step 1050.

In step 1050, an objective function OBJ equal to the sum of N variables is formed, each variable corresponding to one of the Macrocells in the list ML, and each variable having a coefficient equal to the number of P-terms used by the corresponding Macrocell. Control is then passed to step 1060.

In step 1060, an integer programming solver is called to maximize the number of P-terms which can be switched to low power mode without violating the timespecs of any of the timespec paths while maximizing the value of the objective function OBJ. This step is achieved by assigning a value of 1, corresponding to the low power mode, or 0, corresponding to the high power mode, to each variable in the objective function OBJ provided no constraint equations are violated (i.e., the LHS is always less than or equal to the RHS). The integer programming solver is described in additional detail below with reference to FIG. 11. Control is then passed to step 1080.

In step 1080, all Macrocells corresponding to variables with a value of 1 in the solution returned by the integer programming solver are set in low power mode, and the delays of all timespec paths are recalculated. (Recalculation can be omitted if power optimization is performed after slew rate optimization). Control then passes from step 1080 to the main process (FIG. 8).

Figure 11:
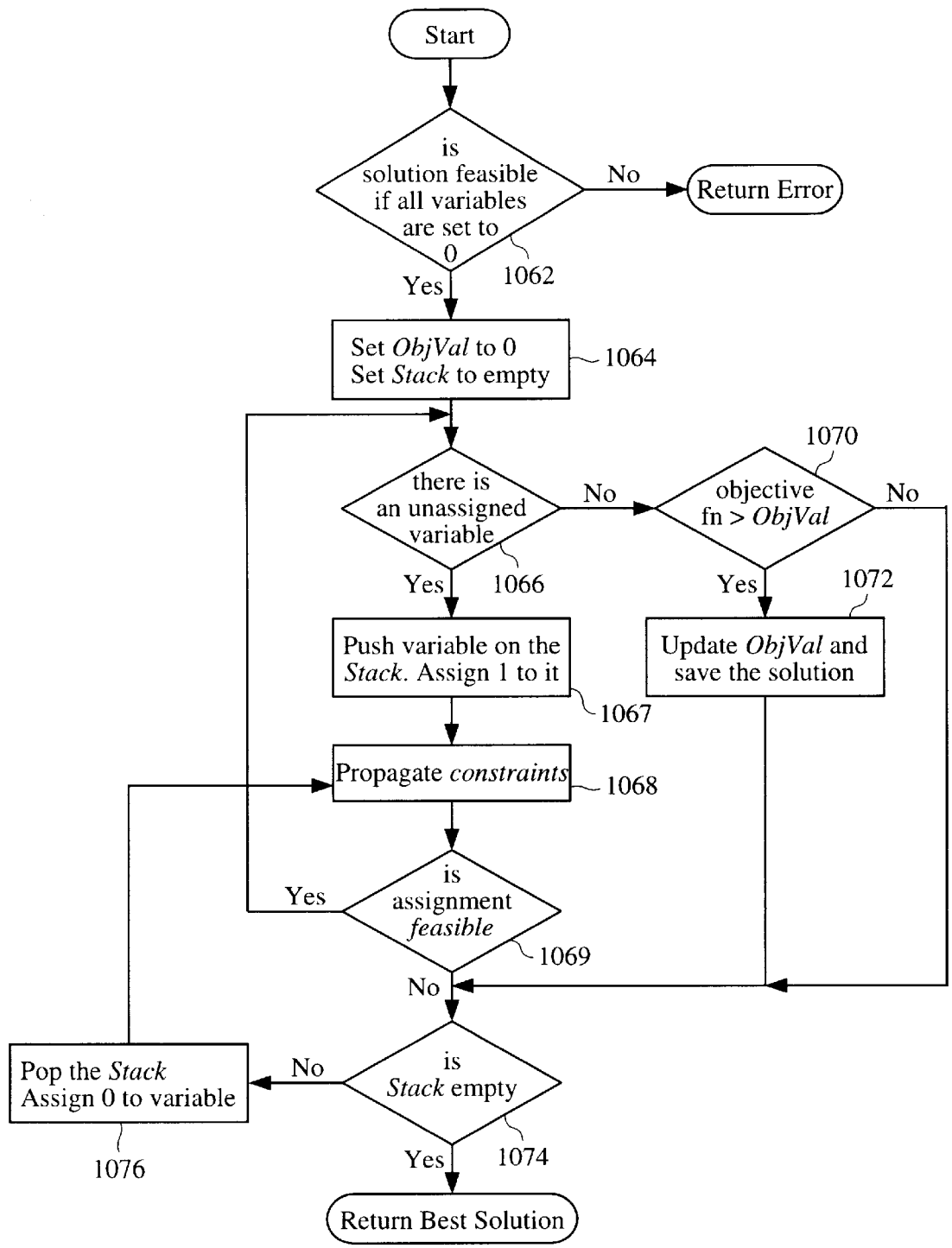
FIG. 11 is a flow diagram showing logic steps associated with an integer programming solver process used during power optimization.

Integer Programming Solver (FIG. 11)

In an integer programming problem, decision variables are selected to maximize (or minimize) an objective function, subject to the requirement that the variables satisfy certain constraints. In 0–1 integer programming, the variables can assume a value of only 0 or 1. This form of problem solving is used for power optimization because it is straightforward to specify the constraints of the problem in the form of equations and to specify an objective function to maximize in terms of the number of P-terms used by each Macrocell. A branch and bound search tree, well known to those skilled in the art, is then explored in order to find the optimal solution.

As applied in the PLD programming method according to the present invention, the integer programming solver is provided with the constraint equations and the objective function OBJ generated in accordance with steps 1040 and 1050, respectively, of the power optimization process (discussed above in reference to FIG. 10).

In step 1062, the feasibility of obtaining a meaningful solution is checked by assigning 0 to all of the variables in the objective function OBJ, and testing whether any of the constraint equations is violated (i.e., the LHS is greater than the RHS). That is, if any of the constraint equations are violated before any of the Macrocells are switched to low power mode (No), then an error is generated (Return Error) and control is returned to the main process (i.e., no better solution would be obtained by continuing the integer programming solver). If none of the constraint equations is violated by setting the variables of the objective function to zero (Yes), then control is passed to step 1064.

In step 1064, the value ObjVal of the objective function is initialized at 0, and a memory stack is cleared (empty). Control is then passed to step 1066.

In step 1066, the objective function is analyzed to determine whether any of its variables have not yet been assigned. If any of the variables is unassigned (Yes), then control passes to step 1067. If all of the variables have been assigned (No), then control passes to step 1070. During the first pass through the step 1066, at least one variable is typically unassigned, so control passes to step 1067.

In step 1067, an unassigned variable in the objective function is pushed into the stack and assigned the value of 1. During the first pass through step 1066, the first variable in the objective function (i.e., representing the Macrocell having the largest number of P-terms) is pushed into the stack and assigned a value of 1 (low power). During subsequent passes, other unassigned variables are pushed into the stack in accordance with their coefficient (variables having the larger coefficient are pushed into the stack (and powered down) before variables having smaller coefficients). Control then passes to step 1068.

In step 1068, the constraints caused by the assignment of a value to the variable in step 1067 is propagated to the other variables in the constraint equations. For example, assume a value of 1 is assigned to the first variable $v_1$ in the constraint equation EqA:

$$1.v_1 + 0.v_2 + 0.v_3 + 1.v_4 \leq 1 \qquad \text{EqA:}$$

Once $v_1$ is assigned the value of 1, constraint equation EqA will be violated if variable $v_4$ is subsequently assigned the value of 1 (i.e., this would raise the LHS of EqA to 2). Therefore, variable $v_4$ is temporarily assigned the value of 0 in step 1068. A similar process is performed in the other constraint equations associated with the user's logic function. This step is used to reduce the search space for the solution by recognizing that further assignment of the value 1 in a subsequent pass through step 1067 to variable $v_4$ would not produce a feasible solution. Control is then passed to step 1069.

In step 1069, the feasibility of the assignment provided in step 1067 is analyzed. This analysis entails checking that the constraint equations are not violated by setting all unassigned variables to 0, and also determining that the best objective function that can be achieved with the current assignment is greater than the current value of ObjVal. The best objective function that can be achieved by the current assignment is obtained by setting all unassigned variables to 1. If the solution is not feasible (i.e., at least one constraint equation is violated), then control passes to step 1074. Conversely, if the assignment does not violate any of the constraint equations and the best objective value that could be achieved by following this path is better than the best obtained so far, then control is returned to step 1066.

Upon returning to step 1066, if all variables are assigned a value of 1 or 0 during steps 1067 or 1068 (or, as discussed below, in step 1072), then control is passed to step 1070. In step 1070, the value of the objective function based on the current solution (all variables are assigned a value of 1 or 0) is compared with the stored value of ObjVal. Initially ObjVal is 0 (zero), as set in step 1064, and the objective function is greater than ObjVal, so control passes to step 1072. For example, assume variables $v_1$, $v_2$, $v_3$ and $v_4$ are associated with Macrocells having 4, 3, 2 and 1 P-terms, respectively. By assigning the value 1 to variable $v_1$ and zeros to the other variables, the objective function has a resulting value of 4, which is greater than ObjVal in step 1070 (Yes). Under this condition, control is passed to step 1072 in which ObjVal is assigned the current value of the objective function (e.g., 4), and control then passes to step 1074. If, during subsequent passes through step 1070, the current solution value is less than the stored ObjVal, then control passes directly from step 1070 to step 1074.

In step 1074, the stack contents are reviewed and, if the stack is not empty, control is passed to step 1076.

In step 1076, the most recently-assigned variable (assigned in step 1067) entered into the stack is "popped" (i.e., removed from the stack), and is assigned a value of 0. Control then passes to step 1068 in which all of the constraint equations are re-analyzed under the new condition (i.e., in view of the popped variable). For example, if variable $v_1$ is popped in step 1076, then the previous assignment of 0 to variable $v_4$ is no longer warranted. Therefore, variable $v_4$ would be reclassified as "unassigned" in step 1068.

The integer programming solver repeats the above steps until all feasible solutions (except for those precluded in step 1069 due to constraint propagation in step 1068) are considered. Therefore, the stack will eventually be empty (Yes in step 1074), and control returned to the power optimization process (step 1080 in FIG. 10).

EXAMPLE

The PLD programming method in accordance with the present invention will now be described with reference to the example shown in FIG. 12. Those of ordinary skill in the art will recognize that the description related to the example also applies to the more complicated situations typically arising in actual PLD programming applications.

Figure 12:
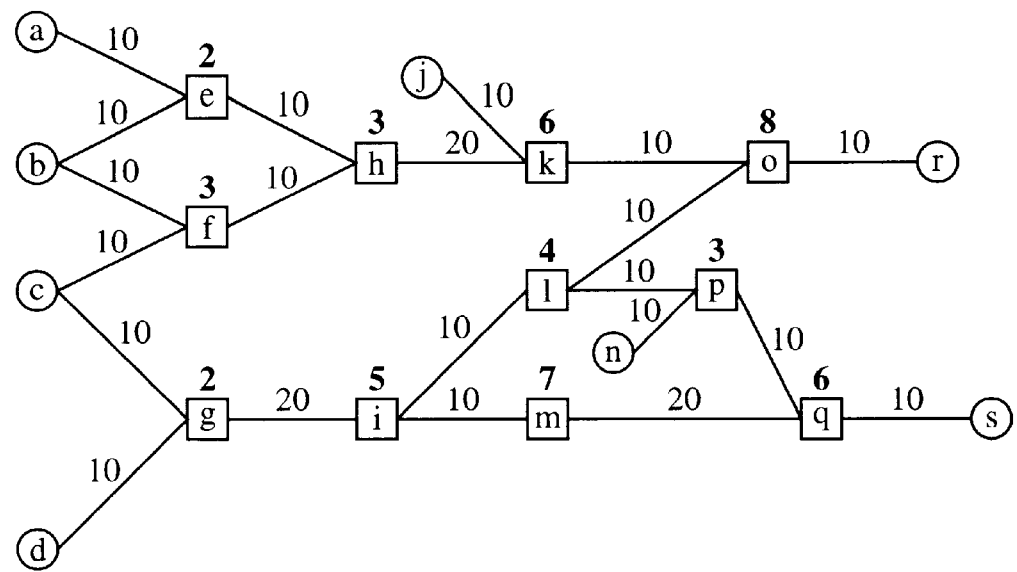
FIG. 12 is a simplified graphical representation showing an exemplary portion of a logic function used to describe the present invention.

Referring to FIG. 12, the simplified example is directed to a logic function including timespec paths having a total of 19 nodes, a to s. Input nodes a, b, c, d, j, and n, and output nodes r and s are indicated with circles, whereas Macrocell nodes e, f, g, h, i, k, l, m, o, p and q are indicated with squares. The number of product terms input to each Macrocell (which includes P-terms input from non-timespec paths, not shown) is indicated (in bold) above each Macrocell node (for example, Macrocell e receives two P-terms). The time delay between each pair of nodes is provided above the line drawn between the pair of nodes (for example, the delay along the segment linking nodes a and e is 10).

Several assumptions are adopted. First, it is assumed that the user has specified that all of the indicated paths to the output node r must have a delay of 100 or less, and that output node r must be set in a slow slew rate mode. Further, the paths from c to s must have a delay of 95 or less. Automatic power/slew optimization is activated, and preference is given to reducing power over reducing slew rate. The default setting is fast slew and high power. Further, it is assumed that setting an output module to slow slew mode causes an additional delay of 10, and operating a Macrocell in low power mode causes an additional delay of 15. Based on these assumptions, the PLD programming method proceeds as follows.

First, in accordance with the main process (FIG. 8), all paths (P1 through P9) with timespecs are identified, and their corresponding slacks are calculated. These paths are stored in memory in the following list, as shown in Table 1 (all I/O nodes are shown in parentheses, and slacks are located on the RHS of each path).

TABLE 1

Path List

P1 = (a)-e-h-k-o-(r) ≦ 30
P2 = (b)-e-h-k-o-(r) ≦ 30 (Ignored--same as P1)
P3 = (b)-f-h-k-o-(r) ≦ 30
P4 = (c)-f-h-k-o-(r) ≦ 30 (Ignored--same as P3)
P5 = (j)-k-o-(r) ≦ 60    (Ignored--subset of P3)
P6 = (c)-g-i-l-o-(r) ≦ 30
P7 = (d)-g-i-l-o-(r) ≦ 30 (Ignored--same as P6)
P8 = (c)-g-i-m-q-(s) ≦ 25
P9 = (c)-g-i-l-p-q-(s) ≦ 25

In accordance with an embodiment of the present invention, paths having redundant Macrocell sets (i.e., paths P2, P4 and P7) are ignored to remove redundant paths (as inputs and outputs do not figure into the power optimization procedure, which is solely determined by the Macrocells). Similarly, paths having nodes which form a subset of another path's Macrocell set (e.g., path P5) are also ignored since the smaller slacks will determine the number of Macrocells in low power mode.

Next, in accordance to the preference set by the user, the power optimization process (FIG. 10) is called. Assume the additional delay for low power is determined to be 15 (step 1010). A list ML is formed which includes the Macrocells e, f, g, h, i, k, l, m, o, p and q (step 1020). These Macrocells are then sorted in accordance with their respective number of P-terms (indicated within brackets), thereby producing the sorted list: o(8), m(7), k(6), q(6), i(5), l(4), h(3), f(3), p(3), e(2) and g(2) (step 1030).

Constraint equations are then created for each of the paths P1, P3, P6, P8 and P9, as shown in Table 2 (step 1040):

TABLE 2

Contraint equations

Eq1: 1.o + 0.m + 1.k + 0.q + 0.i + 0.1
+ 1.h + 0.f + 0.p + 1.e + 0.g ≤2 for P1
Eq2: 1.o + 0.m + 1.k + 0.q + 0.i + 0.1
+ 1.h + 1.f + 0.p + 0.e + 0.g ≤2 for P2
Eq3: 1.o + 0.m + 0.k + 0.q + 1.i + 1.1
+ 0.h + 0.f + 0.p + 0.e + 1.g ≤2 for P6
Eq4: 0.o + 1.m + 0.k + 1.q + 1.i + 0.1
+ 0.h + 0.f + 0.p + 0.e + 1.g ≤1 for P8
Eq5: 0.o + 0.m + 0.k + 1.q + 1.i + 1.1
+ 0.h + 0.f + 1.p + 0.e + 1.g ≤1 for P9

An objective value function is then created as shown in Table 3 (step 1050):

TABLE 3

Objective Value Function

ObjVal = 8.o + 7.m + 6.k + 6.q + 5.i + 4.1 + 3.h
+ 3.f + 3.p + 2.e + 2.g

The integer programming solver is then called (step 1060). First, the solver verifies that a feasible solution is produced by o=m=k=q=i=l=h=f=p=e=g=0 (step 1062). Next, ObjVal is set to 0, and the stack is emptied (step 1064). The first variable from the sorted list is assigned the value of 1 and entered (pushed) into the stack (step 1067). Constraints are then propagated (step 1068), but no more variables set (i.e., none of the paths are constrained by pushing Macrocell o into the stack). Feasibility is then tested (step 1069) which indicates that no constraints are violated, and the best possible objective value achievable by following this solution path is 49 (which is greater than the current ObjVal), so control passes back to step 1066.

Returning to step 1066, because additional unassigned variables exist, control is again passed to step 1067, where Macrocell m (the second Macrocell of the sorted list) is assigned the value of 1, and is entered in the stack (the stack contents are now {o,m}). When constraints are again propagated (step 1068), constraint equation Eq4 forces the temporary assignment of 0 to Macrocells q, i and g because only one Macrocell in this equation can be powered down. Feasibility is then tested (step 1069), which indicates that no constraints are violated, and that the best objective value that could be achieved by following this path is 36 (which is still greater than the current value of ObjVal—i.e. 0). As such, control again passes back to step 1066.

Returning to step 1066 for the second time, because additional unassigned variables still exist, control is again passed to step 1067, where Macrocell k (the third Macrocell of the sorted list) is assigned the value of 1, and is entered in the stack (the stack contents are now {o,m,k}). When constraints are again propagated (step 1068), constraint equation Eq2 forces the temporary assignment of 0 to Macrocell f because only two Macrocells in this equation can be powered down. Feasibility is then tested (step 1069), which indicates that no constraints are violated, and that the best objective value that could be achieved by following this path is 28 (which is still greater than the current value of ObjVal—i.e. 0). As such, control again passes back to step 1066.

Returning to step 1066 for the third time, because additional unassigned variables still exist, control is again passed to step 1067, where Macrocell l (the fourth Macrocell of the sorted list) is assigned the value of 1, and is entered in the stack (the stack contents are now {o,m,k,l}). When constraints are again propagated (step 1068), constraint equation Eq5 forces the temporary assignment of 0 to Macrocell p because only one Macrocell in this equation can be powered down. Feasibility is then tested (step 1069), which indicates that no constraints are violated, and that the best objective value that could be achieved by following this path is 25 (which is still greater than the current value of ObjVal—i.e. 0). As such, control again passes back to step 1066.

Upon returning to step 1066 for the fourth time, because all variables have been assigned either the value 1 or 0, and the objective function value is greater than ObjVal (Yes in step 1070), then ObjVal is set to 25 and this solution saved (step 1072). Control then passes to step 1074. Because the stack is not empty (No in step 1074), control passes to step 1076, in which Macrocell l is assigned the value 0, thereby decreasing the stack to {o,m,k}. Propagation is repeated (step 1068), in which the temporary value of 0 is removed from some of the Macrocells (i.e., because Macrocell l is removed from the stack, Macrocell p reverts to being unassigned). Therefore, control is passed from step 1069 to step 1066, and Macrocell p is pushed into the stack (i.e, the stack now contains {o,m,k,p}).

The above process continues until the whole search space is explored. The complete search tree for this example if shown in FIGS. 13A and 13B, where X indicates infeasibility. Based on this search tree, it can be shown that the best objective value is 25, found in the first branch of the search tree. This solution is then passed back to step 1080 of the power optimization process (FIG. 10).

Referring to FIG. 10, Macrocells o, m, k, and l are placed in a low power mode. The path delays (slacks) of each timespec path is now recomputed as shown in Table 4:

TABLE 4

Recomputed Path List

P1 = (a)-e-h-k-o-(r) ≤ 0
P2 = (b)-e-h-k-o-(r) ≤ 0
P3 = (b)-f-h-k-o-(r) ≤ 0
P4 = (c)-f-h-k-o-(r) ≤ 0
P5 = (j)-k-o-(r) ≤ 30
P6 = (c)-g-i-l-o-(r) ≤ 0
P7 = (d)-g-i-l-o-(r) ≤ 0
P8 = (c)-g-i-m-q-(s) ≤ 10
P9 = (c)-g-i-l-p-q-(s) ≤ 10

Upon completion of power optimization, slew rate optimization (FIG. 9) is called. Assume that the additional delay for slow slew mode is 10 (step 910). Due to the user-defined constraint, output module r is already in slow slew mode, so paths P1, P2, P3, P4, P5, P6 and P7 are not considered (i.e., these paths fail the test set in step 930). Paths P8 and P9 are candidates for slew reduction in the present example.

Turning to the test set forth is step 940, output node s can be changed to slow slew mode without violating the timespecs of all paths from input node c to output node s (i.e. paths P8 and P9). Therefore, these delay margins of these paths are now set to 0 (step 950), as shown in Table 5.

TABLE 5

Path List after Slew Rate Optimization

P1 = (a)-e-h-k-o-(r) ≦ 0
P2 = (b)-e-h-k-o-(r) ≦ 0
P3 = (b)-f-h-k-o-(r) ≦ 0
P4 = (c)-f-h-k-o-(r) ≦ 0
P5 = (j)-k-o-(r) ≦ 30
P6 = (c)-g-i-l-o-(r) ≦ 0
P7 = (d)-g-i-l-o-(r) ≦ 0
P8 = (c)-g-i-m-q-(s) ≦ 0
P9 = (c)-g-i-l-p-q-(s) ≦ 0

Because the path list is now empty (all paths have been considered), the slew rate optimization process passes control back to the main process (FIG. 9), which in turn returns control to the higher level program.

Figure 14:
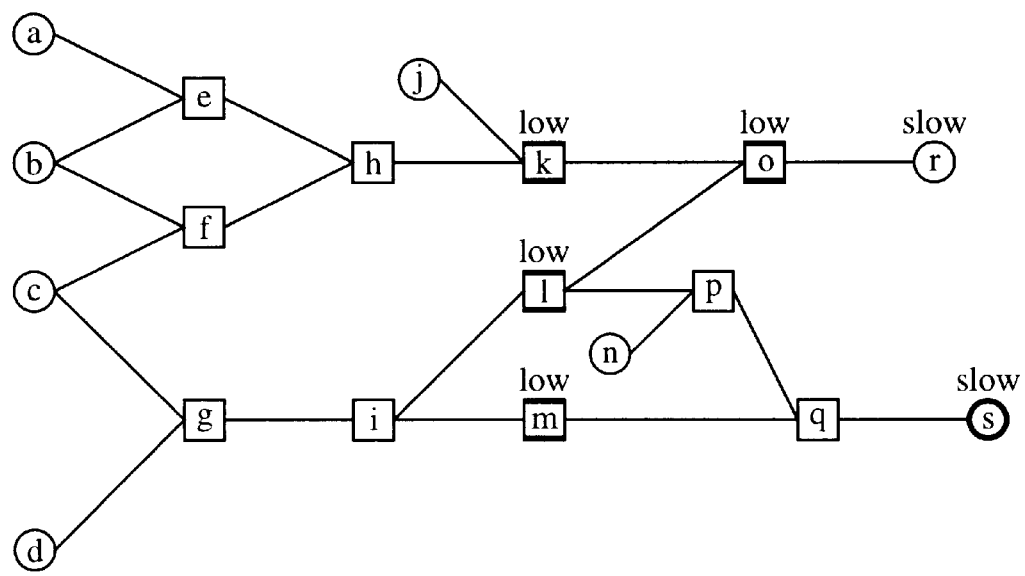
FIG. 14 is a simplified graphical representation indicating a power/slew optimization solution for the example shown in FIG. 12.
Figure 13A:
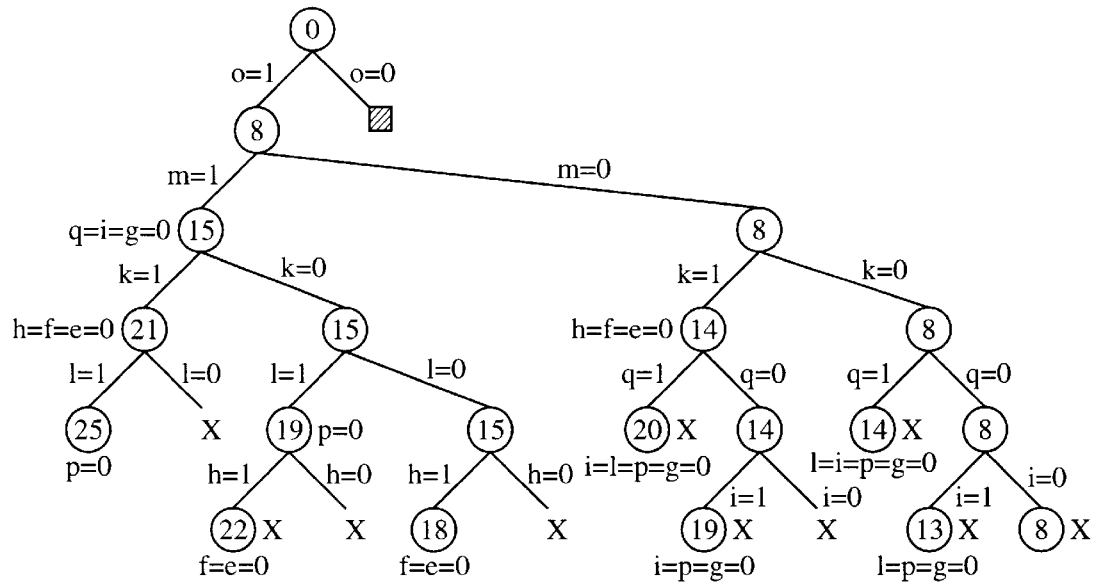
FIGS. 13A and 13B are search tree diagrams illustrating the integer programming solver process as applied to the example shown in FIG. 12.
Figure 13B:
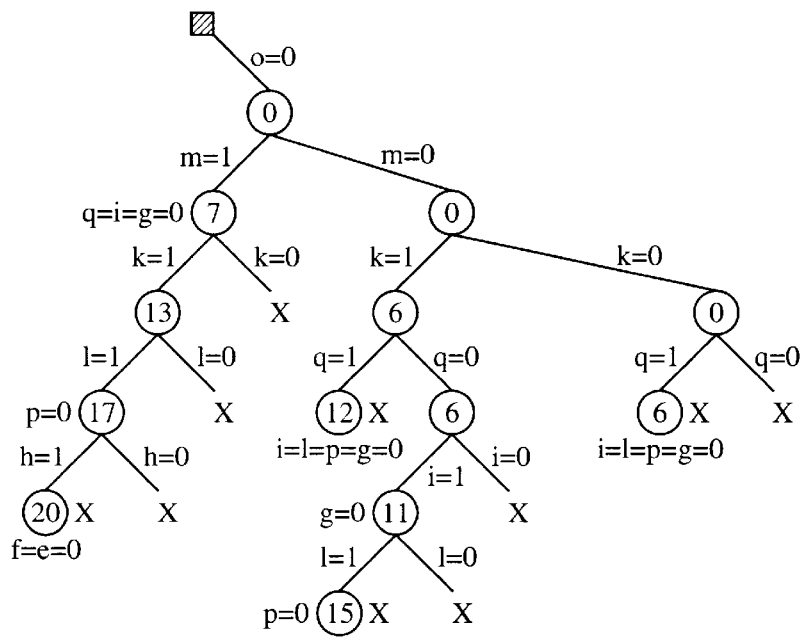

The final result for this example is shown in FIG. 14, where Macrocells k, l, m and o are set to low power mode, and output modules r and s are set to slow slew rate.

Conclusion

Although the present invention has been described in considerable detail with reference to certain preferred embodiments thereof, other embodiments are possible.

For example, there are several possible enhancements which can be made to the above-described embodiments to minimize power dissipation and electrical noise when mapping a user design onto an XC9500 CPLD.

First, power dissipation and electrical noise may be further reduced by reducing power and noise in non-timespec paths. The above-described embodiments only consider timespec paths, and ignore the effect caused by optimizing the timespec paths on the non-timespec paths. As a result, the above-described embodiment may or may not change non-timespec paths. This potential issue can be handled in a more controlled manner by setting a upper limit on the timing of the non-timespec paths and optimizing the nodes on those paths as well, given these constraints. This is likely to result in larger reductions in power and noise, but might require the user or the software to guess at the optimal timespec setting for the non-timespec paths.

Second, the above-described embodiments do not consider the case where a signal might pass through more than one I/O module due to buffering. In such a case, each output pad could be operated with slow slew rate if there is sufficient slack. As in the case of power optimization, the problem becomes more complex when not all I/O modules can be operated in slow slew mode, thereby making it necessary to select which I/O modules to change. This can be achieved using the integer programming solver. The constraints can be represented in terms of variables which correspond to the I/O modules and the number of modules that can be operated in slow slew mode, given the delay for doing so. The objective function is just a sum of these variables because the cost of choosing any pad is the same.

Third, the above-described embodiments are unidirectional in the sense that they only change the power mode of nodes from high to low and slew rate of I/O modules from fast to slow. A further enhancement may consider the case where timespecs are not met because of user-specified low power or slow slew setting on the signals. These enhancements can then change power from low to high and slew rate from slow to fast such that the timespecs are met with minimum cost, which can again be counted in terms of the number of P-terms changed from low to high power and the number of I/O pads changed from slow slew to fast. The constraint equations can be generated in a similar fashion by setting the RHS equal to the number of Macrocells that need to be changed to high power mode to meet the timespecs, and imposing the constraint that the LHS has to be equal to or greater than the RHS. Setting a variable to 1 indicates that it is changed from low to high power mode. The objective function now changes from maximizing the number of P-terms in low power mode to minimizing the number of P-terms in high power mode. This problem can be changed to the maximization problem for the current integer programming solver by negating all the coefficients and RHS of the constraint equations, and initially setting the ObjVal to a large negative number.

Fourth, the above-described embodiments are tailored to the needs and features of the current CPLD architecture. For example, there is only one software switch that controls the powering down of both the AND and OR gates in a Macrocell, even though the hardware can power these elements down separately. Additional software control over these elements (or corresponding elements in other types of PLDs) could lead to more power savings in the eventuality that one or the other, but not both, can be powered down.

Finally, apart from the enhancements proposed above for post-placement optimization, techniques could be applied during placement and pre-placement to improve the resulting solution obtained from post-placement optimization.

In view of the above-mentioned alternative embodiments, the spirit and scope of the appended claims should not be limited to the description of the embodiment related to FIGS. 8 to 11, contained herein.

What is claimed is:

1. A method for controlling power consumption of a programmable logic device, the programmable logic device including a plurality of resources that are programmable to implement a user-defined logic function, each resource being programmable to operate in either a high power mode or a low power mode, the method comprising the steps of:

placing and routing the user-defined logic function such that a plurality of paths of the logic function are assigned to associated resources of the programmable logic device;

identifying a group of said resources associated with at least one path of the logic function which is constrained by a user-defined timing specification;

identifying a sub-group of resources from said group which, when operated in the low power mode, minimizes power consumption of the programmable logic device while satisfying the user-defined timing specifications of said at least one path; and setting the plurality of resources such that the sub-group of resources operate in the low power mode, and a remainder of said resources of the group operate in the high power mode.

2. The method according to claim 1, wherein the step of identifying the sub-group further comprises forming a set of combinations of resources from the group which satisfy the user-defined timing specifications in the low power mode, and identifying a combination from the set of combinations which produces the smallest power consumption.

3. The method according to claim 1, wherein the step of identifying a sub-group of resources comprises:

forming a plurality of constraint equations, each constraint equation being associated with one path of the logic function, each constraint equation including a set of variables representing each resource of its associated path and a value representing a maximum number of resources in the associated path that can be operated in the low power mode without violating the timing specification assigned to the associated path;

forming an objective function including a sum of N variables, each of the N variables being associated with one of the resources in the group of resources, each variable being multiplied by a coefficient whose value corresponds to an amount of power consumed by said associated one of the resources; and selecting the sub-group of resources which maximizes the objective function while satisfying all of the constraint equations.

4. The method according to claim 3, wherein the step of selecting the sub-group of resources comprises utilizing an integer programming solver.

5. The method according to claim 4, wherein the step of utilizing the integer programming solver comprises:

adding a selected resource to the sub-group;

propagating constraints generated by adding the selected resource in each of the constraint equations; and determining whether the addition of the selected resource to the sub-group violates any of the constraint equations.

6. The method according to claim 5, further comprising the steps of:

setting all of the variables of the objective function to zero before the step of adding the selected resource to the sub-group; and determining whether all resources of the group have either been added to the sub-group, or eliminated from the sub-group during the step of propagating constraints.

7. The method according to claim 5, wherein the step of adding a selected resource to the sub-group further comprises assigning a value of one to the constraint equation variables associated with the selected resource such that each constraint equation corresponding to a path including the selected resource is increased by one.

8. The method according to claim 7, wherein the step of propagating constraints further comprises comparing each constraint equation with its associated value representing the maximum number of resources that can be operated in the low power mode, and temporarily assigning a value of zero to all variables associated with resources in each constraint equation whose sum of variables is equal to its associated value.

9. The method according to claim 8, further comprising the steps of:

removing the selected resource from the sub-group and assigning a value of zero to all variables in the constraint equations associated with the selected resource if the step of determining identifies a constraint equation which is violated by the addition of the selected resource to the sub-group; and repeating the step of propagating constraints.

10. The method according to claim 9, further comprising the steps of:

setting all of the variables of the objective function to zero before the step of adding the selected resource to the sub-group; and determining whether all of the variables in the objective function have been assigned a value in any of the steps of adding the selected resource, removing the selected resource, or propagating constraints; and if all variables have been assigned a value, storing the sum of N variables from the objective function.

11. A method for controlling an output slew rate of a programmable logic device, the programmable logic device including a plurality of resources that are programmable to implement a user-defined logic function, each resource being programmable to operate in either a fast slew mode or a slow slew mode, the method comprising the steps of:

placing and routing the user-defined logic function such that a plurality of signal paths of the logic function are assigned to associated resources of the programmable logic device;

identifying a group of said resources associated with at least one path of the logic function which is constrained by a user-defined timing specification;

identifying a sub-group of resources from said group which, when operated in the slow slew mode, minimizes noise at the output terminals of the programmable logic device while satisfying the user-defined timing specifications of said at least one path; and setting the plurality of resources such that the sub-group of resources operate in the slow slew mode, and a remainder of said resources of the group operate in the fast slew mode.

12. The method according to claim 11, wherein the step of identifying the sub-group further comprises selecting a path from the plurality of paths which terminates at an output node, and determining whether the output node of the selected path is designated for fast slew mode operation.

13. The method according to claim 12, wherein the step of identifying the sub-group further comprises:

identifying all paths ending at the output node;

comparing the slacks associated with the selected path and the identified paths with a predetermined additional delay produced when the output node is operated in the slow slew mode; and designating the output node for slow slew mode operation if the slacks of the selected path and the identified paths are greater than or equal to the predetermined additional delay.

14. A method for controlling power consumption and an output slew rate of a programmable logic device, the complex programmable logic device including a plurality of resources that are programmable to emulate a user-defined logic function, each resource being programmable to operate in either a high power mode or a low power mode, each resource also being programmable to operate in either a fast slew mode or a slow slew mode, the method comprising the steps of:

placing the user-defined logic function such that a plurality of paths of the logic function are assigned to associated resources of the programmable logic device;

identifying a group of said resources associated with at least one path of the logic function which is constrained by a user-defined timing specification;

identifying at least one of a first sub-group and a second sub-group of resources from said group, wherein the first sub-group, when operated in the low power mode, minimizes power consumption of the programmable logic device while satisfying the user-defined timing specifications of said at least one path, and wherein the second sub-group, when operated in the slow slew mode, minimizes noise at the output terminals of the programmable logic device while satisfying the user-defined timing specifications of said at least one path; and setting the plurality of resources such that the first sub-group of resources operate in the low power mode, and the second sub-group of resources of the group operate in the slow slew mode.

15. The method according to claim 14, wherein said first sub-group is identified before said second sub-group.

16. The method according to claim 14, wherein said second sub-group is identified before said first sub-group.

17. The method according to claim 14, wherein the first sub-group of resources comprise macrocells of the programmable logic device, and the second sub-group of resources comprise output modules of the programmable logic device.

18. The method of claim 17, wherein the step of identifying further comprises the steps of:

forming a plurality of constraint equations, each constraint equation being associated with one path of the logic function, each constraint equation including a set of variables representing each macrocell of its associated path and a value representing a maximum number of macrocells in the associated path that can be operated in the low power mode without violating the timing specification assigned to the associated path;

forming an objective function including a sum of N variables, each of the N variables being associated with one of the macrocells in the group of resources, each variable being multiplied by a coefficient whose value is equal to a number of product terms assigned to the macrocell; and selecting said first sub-group of macrocells which maximizes the objective function while satisfying all of the constraint equations.

19. The method according to claim 18, wherein the step of selecting the first sub-group comprises:

adding a selected macrocell to the first sub-group;

propagating constraints generated by adding the selected macrocell in each of the constraint equations; and determining whether the addition of the selected macrocell to the sub-group violates any of the constraint equations.

20. The method according to claim 17, wherein the step of identifying further comprises the steps of:

selecting a path from the plurality of paths which terminates at an output module;

identifying all paths ending at the output module;

comparing the slacks associated with the selected path and the identified paths with a predetermined additional delay resulting from operating the output module in the slow slew mode; and designating the output module for slow slew mode operation if the slacks of the selected path and the identified paths are greater than or equal to the predetermined additional delay.

* * * * *